(12) United States Patent
Ofer et al.

(10) Patent No.: US 7,550,216 B2
(45) Date of Patent: Jun. 23, 2009

(54) COMPOSITE SOLID POLYMER ELECTROLYTE MEMBRANES

(75) Inventors: David Ofer, Needham, MA (US); Bindu R. Nair, Framingham, MA (US); Emily J. Stoler, Somerville, MA (US); Robert F. Kovar, Wrentham, MA (US)

(73) Assignee: Foster-Miller, Inc., Waltham, MA (US)

( * ) Notice: Subject to any disclaimer, the term of this patent is extended or adjusted under 35 U.S.C. 154(b) by 592 days.

(21) Appl. No.: 10/851,478

(22) Filed: May 22, 2004

(65) Prior Publication Data

US 2005/0031925 A1   Feb. 10, 2005

Related U.S. Application Data

(60) Continuation-in-part of application No. 09/750,402, filed on Dec. 28, 2000, now Pat. No. 7,052,793, which is a division of application No. 09/261,397, filed on Mar. 3, 1999, now Pat. No. 6,155,329.

(51) Int. Cl.
    *H01M 8/10* (2006.01)
(52) U.S. Cl. .................. 429/30; 429/33; 429/188; 429/192; 429/314; 524/602
(58) Field of Classification Search ............ 429/30, 429/33, 188, 192, 314; 524/602
    See application file for complete search history.

(56) References Cited

U.S. PATENT DOCUMENTS

| | | | |
|---|---|---|---|
| 3,284,238 A | 11/1966 | White | |
| 3,528,954 A | 9/1970 | Carlson | |
| 4,110,265 A | 8/1978 | Hodgdon | |
| 4,116,888 A | 9/1978 | Ukihashi et al. | |
| 4,138,373 A | 2/1979 | Ukihashi et al. | |
| 4,138,426 A | 2/1979 | England | |
| 4,191,811 A | 3/1980 | Hodgdon | |
| 4,273,903 A | 6/1981 | Rose | |
| 4,330,654 A | 5/1982 | Ezzell et al. | |
| 4,358,412 A | 11/1982 | Ezzell et al. | |
| 4,413,106 A | 11/1983 | Coplan et al. | |
| 4,714,663 A | 12/1987 | Arnold, Jr. et al. | |
| 4,814,399 A | 3/1989 | Sansone et al. | |
| 4,845,150 A * | 7/1989 | Kovak et al. | 524/602 |
| 4,865,930 A | 9/1989 | Kindler et al. | |
| 5,013,765 A | 5/1991 | Sluma et al. | |
| 5,080,698 A | 1/1992 | Krizan | |
| 5,168,011 A | 12/1992 | Kovar et al. | |
| 5,202,165 A | 4/1993 | Lusignea et al. | |
| 5,259,950 A | 11/1993 | Shiro et al. | |
| 5,271,813 A | 12/1993 | Linkous | |
| 5,288,529 A | 2/1994 | Harvey et al. | |
| 5,300,206 A | 4/1994 | Allen et al. | |
| 5,348,569 A | 9/1994 | Bikson et al. | |
| 5,362,836 A | 11/1994 | Helmer-Metzmann et al. | |
| 5,403,675 A * | 4/1995 | Ogata et al. | 429/33 |
| 5,422,411 A | 6/1995 | Wei et al. | |
| 5,438,082 A | 8/1995 | Helmer-Metzmann et al. | |
| 5,501,831 A | 3/1996 | Kovar et al. | |
| 5,525,436 A | 6/1996 | Savinell et al. | |
| 5,547,551 A | 8/1996 | Bahar et al. | |
| 5,561,202 A | 10/1996 | Helmer-Metzmann et al. | |
| 5,585,039 A | 12/1996 | Matsumoto et al. | |
| 5,599,614 A | 2/1997 | Bahar et al. | |
| 5,599,638 A | 2/1997 | Surampudi et al. | |
| 5,599,639 A | 2/1997 | Sansone et al. | |
| 5,609,795 A | 3/1997 | Matsumoto et al. | |
| 5,635,041 A | 6/1997 | Bahar et al. | |
| 5,656,389 A | 8/1997 | Tetzlaff et al. | |
| 5,723,086 A | 3/1998 | Ledjeff et al. | |
| 5,773,162 A | 6/1998 | Surampudi et al. | |
| 6,524,665 B2 * | 2/2003 | Sahouani et al. | 428/1.2 |
| 2004/0028973 A1 | 2/2004 | Pan et al. | |

FOREIGN PATENT DOCUMENTS

| | | |
|---|---|---|
| DK | 42 43 600 A1 | 7/1993 |
| EP | 0 008 895 | 3/1980 |
| EP | 008895 * | 3/1980 |
| EP | 0 227 299 A | 7/1987 |
| EP | 0 277 834 A | 8/1988 |
| JP | 4204522 | 7/1992 |
| JP | 5326037 | 12/1993 |
| JP | 6029032 | 2/1994 |
| JP | 6242474 | 9/1994 |
| WO | WO-96/13872 | 5/1996 |
| WO | WO-96/18216 | 6/1996 |
| WO | WO-96/29360 | 9/1996 |
| WO | WO-96/40798 | 12/1996 |
| WO | WO-97/24777 | 10/1997 |
| WO | WO-96/05707 | 11/1997 |
| WO | WO-98/11614 | 3/1998 |
| WO | WO-98/22989 | 5/1998 |

OTHER PUBLICATIONS

U.S. Appl. No. 09/262,861, Formato et al.

(Continued)

*Primary Examiner*—Peter D. Mulcahy
*Assistant Examiner*—Henry Hu
(74) *Attorney, Agent, or Firm*—David G. Conlin; Christine C. O'Day; Edwards Angell Palmer & Dodge LLP

(57) ABSTRACT

The present invention relates to composite solid polymer electrolyte membranes (SPEMs) which include a porous polymer substrate interpenetrated with a water soluble ion-conducting material. SPEMs of the present invention are useful in electrochemical applications, including fuel cells and electrodialysis.

40 Claims, No Drawings

OTHER PUBLICATIONS

U.S. Appl. No. 09/261,349, Formato et al.

Database WPI, sec. Ch., Week 198049, Derwent Publications, Ltd., London, GB; Class A25, AN 1980-87481C, XP002164079. JP 55137005 A, Teijin Ltd., Oct. 25, 1980.

Database WPI, sec. Ch., Week 198434, Derwent Publications, Ltd., London, GB; Class A88, AN 1984-209372, XP002164080. JP 59120211 A, Asahi Glass Co. Ltd., Jul. 11, 1984.

A.B. LaConti, et al., "Solid Polymer Electrolyte Electrochemical Cells: Electrode and Other Materials Considerations", General Electric Company, Wilmington, MA 1974, pp. 354-374.

Ueda, et al., "Synthesis and Characterization of Aromatic PES Containing Pendant Sodium Sulfonate Groups", J. Polymer Science, vol. 31, 1993, p. 853-858.

Kerres, et al., "New Ionomers and Their Applications in PEM Fuel Cells", ICE, Stuttgart, Germany, 1998, pp. 1951-1956.

Kreuer, K. D., "Membrane Materials for PEM Fuel Cells: A Microstructural Approach", Electrochemical Society Proceedings, vol. 95-23, pp. 241-246.

Xu, et al., "Preliminary Study of Phosphonate Ion Exchange Membranes for PEM Fuel Cells", SUNY, Syracuse, NY, 1996, 2 pgs.

Kolde, et al., "Advanced Composite Polymer Electrolyte Fuel Cell Membranes", Electrochemical Society Proceedings, vol. 95-23, pp. 193-201.

Ren, et al., "Methanol Cross-over in Direct Methanol Fuel Cells", Electrochemical Society Proceedings, vol. 95-23, 1995, pp. 284-298.

Jones, D.J., et al., "New Proteon Conductors For Fuel Cell Applications", Enviornmental Research Forum, vols. 1-2 (1996), p. 115-126.

F. KuCera, et al., "Homogeneous and Heterogeneous Sulfonation of Polymers: A Review", Polymer Engineering and Science, May 1998, vol. 36, No. 5, pp. 783-792.

Tsuchida, et al., "Synthesis and Proton Conductivity of Highly Sulfonated Poly (thiophenylene)", Macromolecules, 1997, vol. 30, pp. 2941-2946.

M. Kurihara, et al., "The Major Developments of the Evolving Reverse Osmosis Membranes and Ultrafiltration Membranes", Polymer Journal, vol. 23, No. 5, pp. 513-520.

P. Clemenson, et al., "Synthesis and Characterization of New Water-Soluable Precursors of Polyimides", Polymer Engineering and Science, Jun. 1997, vol. 37, No. 6, pp. 966-977.

L.H. Sperling, et al, "The Current Status of Interpreting Polymer Networks", IPNs Around the World, Edited by S.C. Kim and L.H. Sperling, 1997 John Wiley & Sons, Ltd.

A.B. LaConti, et al., "Morphology And Reverse Osmosis Properties of Sulfonated 2,6-Dimethyl Polyphenylene Oxide Membranes", Reprinted from Reverse Osmosis Membrane Research, 1972, pp. 263-284.

D. Weng, et al., "Electo-osmotic Drag Coefficient of Water and Methanol in Polymer Electrolytes at Elevated Temperatures", J. Electrochem. Soc., vol. 143, No. 4, Apr. 1996, pp. 1260-1263.

A.V. Anantaraman, et al., "Studies on Ion-exchange Membranes. Part 1 Effect of Humidity on the Conductivity of Nafion", Journal of Electroanalytical Chemistry, 414 (1996), pp. 115-120.

Y. Sone, et al, "Proton Conductivity of Nafion 117 as Measured by a Four-Electrode AC Impedance Method", J. Electrochem. Soc., vol. 143, No. 4, Apr. 1996, pp. 1254-1259.

M. Schulze, et al., "Proton Exchange With Alkaline Ions in Nafion", six pages.

J.J. Sumner, et al., "Proton Conductivity in Nafion 117 and in a Novel Bis [(perfluoroalkyl)sulfonyl]imide Ionomer Membrane", J. Electrochem. Soc., vol. 145, No. 1, Jan. 1998, pp. 107-111.

T. Okada, et al., "Transport And Equilibrium Properties of Nafion Membranes With H+ and Na+Ions", Journal of Electroanalytical Chemistry, 442 (1998), pp. 137-145.

J. Kerres, et al., "Development and Characterization of Crosslinked Ionomer Membranes Based Upon Sulfinatedand Sulfonated PSU Crosslinked PSU Blend Membranes By Disproportionation of Sulfinic Acid Groups", Journal of Membrane Science, 239 (1998) pp. 211-225.

N.M. Belomonia, et al., "Thermoreactive Sulfur-Containing Poly(phenylquinoxaline)s", Polymer Science, Series B, vol. 38, Nos. 1-2, 1996, pp. 98-100.

T. Kobayashi, et al., "Proton-Conducting Polymers Derived from Poly(ether-etherketone) and Poly(4-phenoxybenzoyl-1-1,4-phenylene)", Solid State Ionics, 106 (1998), pp. 219-225.

G. Alberti, et al., "Layered metal IV Phos phonates, a Large Class of inorgano-organic Proton Conductors", Solid State Ionics, 97, (1997), p. 177-186.

Y. Uchimoto, et al., "Ionically Conductive Thin Polymer Films Prepared by Plasma Polymerization, Part 7. Preparation and Characterization of Solid Polymer Electrolyte Having Fixed Carboxylic Acid Groups with Single Mobile Species", Solid State Ionics, 40/41 (1990), pp. 624-627.

T.A. Zawadzinski, Jr., et al., "Water Uptake by and Transport Through Nafion 117 Membranes", Journal of the Electrochemical Society, vol. 40, No. 4, Apr. 1993, pp. 1041-1047.

R.W., Kopitzke, et al, "Sulfonation of Poly(phenylquinoxaline) Film", Journal of Polymer Science: Part A: Polymer Chemistry, vol. 86 (1998), pp. 1197-1199.

PCT International Search Report (Form PCT/ISA/210) dated Jan. 26, 1999 (3 pages) re Int'l Appln. No. PCT/US98/17898.

* cited by examiner

COMPOSITE SOLID POLYMER ELECTROLYTE MEMBRANES

This application is a continuation-in-part of U.S. application Ser. No. 09/750,402, filed Dec. 28, 2000, now U.S. Pat. No. 7,052,793 which is a divisional application of U.S. application Ser. No. 09/261,397 filed Mar. 3, 1999 now issued as U.S. Pat. No. 6,155,329, which claimed the benefit of International Application PCT/US98/17898 filed Aug. 28, 1998, which claimed benefit from U.S. Provisional Application No. 60/057,233 filed Aug. 29, 1997.

STATEMENT OF GOVERNMENT RIGHTS

This invention was made with Government support under Contract No. F33615-01-C-2112 and Contract No. F-33615-02-C-2294 awarded by the U.S. Air Force. The Government has certain rights in this invention.

FIELD OF THE INVENTION

This invention relates to novel composite solid polymer electrolyte membranes (SPEMs) for use in electrochemical applications. Methods for producing the composite membranes of the invention are also disclosed.

BACKGROUND OF THE INVENTION

There is a considerable need in both the military and commercial sectors for quiet, efficient and lightweight electric power sources that have improved power density. Military applications include, but are not limited to, submersibles, surface ships, ground vehicles, air vehicles, portable/mobile field generating units, and low power units (i.e., battery replacements). For example, the military has a strong interest in developing high specific energy electrical power sources for unmanned airborne vehicles. Commercial applications include transportation (i.e., automotive, bus, truck and railway), communications, on-site cogeneration and stationary power generation.

Much of this interest has been spurred by environmental problems related to gasoline-powered internal combustion engine and the exhaust gases generated by same. One possible solution to these environmental problems is the use of fuel cells. Fuel cells are highly efficient electrochemical energy conversion devices that directly convert the chemical energy of fuels (such as hydrogen, methanol, and the like) into electrical energy and generate innocuous byproducts such as water.

Significant research and development activity has focused on the development of proton-exchange membrane fuel cells. Proton-exchange membrane fuel cells have a polymer electrolyte membrane disposed between a positive electrode operating as a cathode and a negative electrode operating as an anode. The polymer electrolyte membrane is composed of an ion-exchange polymer (i.e., ionomer). Its role is to provide a means for ionic transport and prevent mixing of the fuel and the oxidant.

Solid polymer electrolyte fuel cells (SPEFCs) are an ideal source of quiet, efficient, and lightweight power. While batteries have reactants contained within their structure which eventually are used up, fuel cells most commonly use air and hydrogen which can be continuously supplied to them, allowing them to continue operation without interruption. Their fuel efficiency is high (45 to 50 percent), they do not produce noise, operate over a wide power range (10 watts to several hundred kilowatts), and are relatively simple to design, manufacture and operate. Further, SPEFCs currently have the highest power density of all fuel cell types. In addition, SPEFCs do not produce any environmentally hazardous emissions such as $NO_x$ and $SO_x$ (typical combustion by-products).

The traditional SPEFC contains a solid polymer ion-exchange membrane that lies between two gas diffusion electrodes, an anode and a cathode, each commonly containing a metal catalyst supported by an electrically conductive material. The gas diffusion electrodes are exposed to the respective reactant gases, the reductant gas and the oxidant gas. An electrochemical reaction occurs at each of the two junctions (three phase boundaries) where one of the electrodes, electrolyte polymer membrane and reactant gas interface.

During fuel cell operation, hydrogen permeates through the anode and interacts with the metal catalyst, producing electrons and protons. The electrons are conducted via an electrically conductive material through an external circuit to the cathode, while the protons are simultaneously transferred via an ionic route through the polymer electrolyte membrane to the cathode. Oxygen permeates to the catalyst sites of the cathode, where it gains electrons and reacts with protons to form water. Consequently, the products of the SPEFC's reactions are water, electricity and heat. In the SPEFC, current is conducted simultaneously through ionic and electronic routes. Efficiency of the SPEFC is often dependent on its ability to minimize both ionic and electronic resistivity to these currents.

Ion exchange membranes play a vital role in SPEFCs. In SPEFCs, the ion-exchange membrane has two functions: (1) it acts as the electrolyte that provides ionic communication between the anode and cathode; and (2) it serves as a separator for the two reactant gases (e.g., $O_2$ and $H_2$). In other words, the ion-exchange membrane, while serving as a good proton transfer membrane, must also have low permeability for the reactant gases to avoid cross-over phenomena that reduce performance of the fuel cell. This is especially important in fuel cell applications in which the reactant gases are under pressure and the fuel cell is operated at elevated temperatures.

Fuel cell reactants are classified as oxidants and reductants on the basis of their electron acceptor or electron donor characteristics. Oxidants include pure oxygen, oxygen-containing gases (e.g., air) and halogens (e.g., chlorine). Reductants include hydrogen, carbon monoxide, natural gas, methane, ethane, formaldehyde and methanol. Most SPEFCs employ hydrogen as the reductant, oxygen as the oxidant and protons as the current-carrying ion in the solid polymer electrolyte membrane, and consequently water is produced at the cathode as a waste product. In such SPEFCs, optimized proton and water transports of the membrane and proper water management are crucial for efficient fuel cell application. Dehydration of the membrane reduces proton conductivity, and excess water can lead to swelling of the membranes. Inefficient removal of by-product water can cause flooding of the electrodes hindering gas access. Both of these conditions lead to poor cell performance.

Despite their potential for many applications, SPEFCs have not yet been widely commercialized due to unresolved technical problems and high overall cost. Many of these factors impacting the commercialization of the SPEFC are related to deficiencies of today's leading membranes and electrodes. Platinum is routinely used as a catalyst in the electrodes, and it is highly desirable to minimize electrodes catalyst loading in order to reduce cost. However, hydrogen generated by hydrocarbon reforming, which is an inexpensive hydrogen source, is frequently contaminated with trace impurities, such as carbon monoxide, which poison platinum catalysts. Extra processing required to remove these impurities from reformate hydrogen is very costly, as is the addition of extra platinum catalyst to electrodes to compensate for reduced activity in the presence of impurities. It would be desirable to develop a SPEFC capable of operating at temperatures above 120° C., at which temperatures the catalyst poisoning is reduced. An added benefit and cost reduction would be a substantial decrease in the amount of cooling required for the fuel cell. However, today's ion-exchange membranes can not be operated at temperatures much above 90° C. to 95 ° C. due to loss of conductivity and/or insufficient mechanical strength at higher temperatures.

Many current membranes are not suitable for use in low temperature (e.g., less than 100° C.) direct methanol fuel cell applications. Current membranes permit excessive methanol crossover in liquid feed direct methanol fuel cells which decreases operational efficiency of the fuel cell (losses are dependent on actual operating conditions, but is often equivalent to a current density loss of about 50 to 200 $mA/cm^2$ @ 0.5V). This crossover results in poor fuel efficiency as well as limited performance levels.

To make the SPEFC commercially viable (especially in automotive applications), the membranes employed must operate at elevated/high temperatures (>120° C.) so as to provide increased power density, and limit catalyst sensitivity to fuel impurities. This would also allow for applications such as on-site cogeneration (high quality waste heat in addition to electrical power).

Several polymer electrolyte membranes have been developed over the years for application as solid polymer electrolytes in fuel cells. However, these membranes have significant limitations when applied to liquid-feed direct methanol fuel cells and to hydrogen fuel cells. The membranes in today's most advanced SPEFCs do not possess the required combination of ionic conductivity, mechanical strength, dehydration resistance, chemical stability and fuel impermeability (e.g., methanol crossover) to operate at elevated temperatures.

DuPont developed a series of perfluorinated sulfonic acid membranes known as Nafion® membranes. The Nafion® membrane technology is well known in the art and is described in U.S. Pat. Nos. 3,282,875 and 4,330,654. Unreinforced Nafion® membranes are used almost exclusively as the ion exchange membrane in present SPEFC applications. This membrane is fabricated from a copolymer of tetrafluoroethylene (TFE) and a perfluorovinyl ethersulfonyl fluoride. The vinyl ether comonomer is copolymerized with TFE to form a melt-processable polymer. Once in the desired shape, the sulfonyl fluoride group is hydrolyzed into the ionic sulfonate form.

The fluorocarbon component and the ionic groups are incompatible or immiscible (the former is hydrophobic, the latter is hydrophilic). This causes a phase separation, which leads to the formation of interconnected hydrated ionic "clusters". The properties of these clusters determine the electrochemical characteristics of the polymer, since protons are conducted through the membrane as they "hop" from one ionic cluster to another. To ensure proton flow, each ionic group needs a minimum amount of water to surround it and form a cluster. If the ionic group concentration is too low (or hydration is insufficient) proton transfer will not occur. At higher ionic group concentrations (or increased hydration levels) proton conductivity is improved, but membrane mechanical characteristics are sacrificed.

As the membrane temperature is increased, the hydrated membrane softens and becomes susceptible to mechanical failure by developing a pinhole or allowing a contact short between the electrodes. At even higher temperatures (230° C.), the fluorocarbon phase melts and permits the ionic domains to "dissolve" (phase inversion of Nafion®).

There are several mechanisms that limit the performance of Nafion® membranes in fuel cell environments at temperatures above 100° C. In fact, these phenomena may begin at temperatures above even 80° C. Mechanisms include membrane dehydration, reduction of ionic conductivity, loss of mechanical strength via softening, and increased parasitic losses through high fuel permeation.

Crossover problems with Nafion® membranes are especially troublesome in liquid feed direct methanol fuel cell applications, where excessive methanol transport (which reduces efficiency and power density) occurs. Methanol-crossover not only lowers fuel utilization efficiency but also adversely affects the oxygen cathode performance, significantly lowering cell performance.

The Nafion® membrane/electrode is also very expensive to produce, and as a result it is commercially prohibitive for many applications. Reducing membrane cost is crucial to the commercialization of SPEFCs. It is estimated that membrane cost must be reduced by at least an order of magnitude from the Nafion® model for SPEFCs to become commercially attractive.

Another type of ion-conducting membrane, Gore-Select® (commercially available from W. L. Gore), is currently being developed for fuel cell applications. Gore-Select® membranes are further detailed in a series of U.S. Patents (U.S. Pat. Nos. 5,635,041, 5,547,551 and 5,599,614).

Gore discloses a composite membrane consisting of a porous Teflon® film filled with a Nafion® or Nafion®-like ion-conducting solution. Although it has been reported to show high ionic conductance and greater dimensional stability than Nafion® membranes, the Teflon® and Nafion® materials selected and employed by Gore as the film substrate and the ion-exchange material, respectively, may not be appropriate for operation in high temperature SPEFCs. Teflon® undergoes extensive creep at temperatures above 80° C., and Nafion® and similar ionomers swell and soften above the same temperature. This can result in the widening of interconnected channels in the membrane and allow performance degradation, especially at elevated temperatures and pressures.

Further, Gore-Select®, as well as many other types of perfluorinated ion-conducting membranes (e.g., Aciplex from Asahi Chemical, Flemion® from Asahi Glass, Japan), are just as costly as Nafion®, since these membranes employ a high percentage of perfluorinated ionomers.

In an effort to reduce costs and move toward potential commercialization of SPEFCs, ion-exchange membranes that are less expensive to produce also have been investigated for use in polymer electrolyte membrane fuel cells.

Poly(trifluorostyrene) copolymers have been studied as membranes for use in polymer electrolyte membrane fuel cells. See e.g., U.S. Pat. No. 5,422,411. However, these membranes are suspected to have poor mechanical and film forming properties. In addition, these membranes may be expensive due to the inherent difficulties in processing fluorinated polymers.

Sulfonated poly(aryl ether ketones) developed by Hoechst AG are described in European Patent No. 574,891,A2. These polymers can be crosslinked by primary and secondary amines. However, when used as membranes and tested in polymer electrolyte membrane fuel cells, only modest cell performance is observed.

Sulfonated polyaromatic based systems, such as those described in U.S. Pat. Nos. 3,528,858 and 3,226,361, also have been investigated as membrane materials for SPEFCs.

However, these materials suffer from poor chemical resistance and mechanical properties that limit their use in SPEFC applications.

Solid polymer membranes comprising a sulfonated poly (2,6 dimethyl 1,4 phenylene oxide) alone or blended with poly(vinylidene fluoride) also have been investigated. These membranes are disclosed in WO 97/24777. However, these membranes are known to be especially vulnerable to degradation from peroxide radicals.

The inherent problems and limitations of using solid polymer electrolyte membranes in electrochemical applications, such as fuel cells, at elevated/high temperatures (>100° C.) have not been solved by the polymer electrolyte membranes known in the art. Specifically, maintaining high ion conductivity and high mechanical strength, resisting dehydration and other forms of degradation remain problematic, especially at elevated operating temperatures. As a result, commercialization of SPEFCs has not been realized.

It would be highly desirable to develop an improved solid polymer electrolyte membrane with high resistance to dehydration, high mechanical strength and stability to temperatures of at least about 100° C., more preferably to at least about 120° C.

It would also be highly desirable to develop a membrane with the afore-mentioned characteristics that would be suitable for use in a hydrogen or methanol fuel cell and that would provide an economical option to currently available membranes. The development of such a membrane would promote the use of SPEFCs in a variety of highly diverse military and commercial applications, and would be beneficial to industry and to the environment.

SUMMARY OF THE INVENTION

The present invention provides innovative solid polymer electrolyte membranes that are capable of operating at much higher temperatures and pressures than those known in the art. Methods for producing such membranes are also provided. The membrane manufacturing technologies developed emphasize improved performance at reduced cost.

A central object of the invention is to provide an improved solid polymer electrolyte membrane (SPEM) having the following characteristics: high ionic conductivity, high resistance to dehydration, high mechanical strength, chemical stability to the acidic and oxidizing environment of an operating PEM fuel cell, low gas permeability to limit parasitic losses, and stability at elevated temperatures and pressures.

Another object of the invention is to provide an improved solid polymer electrolyte membrane with electronic conductivity approaching zero, dimensional stability, and a membrane that is non-brittle in both dry and wet forms.

Another object of the invention is to provide an improved solid polymer electrolyte membrane that is resistant to methanol cross-over when used in a direct methanol fuel cell.

Another object of the invention is to substantially lower the overall cost of producing solid polymer electrolyte membranes to allow for commercialization of SPEFCs.

A further object of the invention is to provide methods that can be employed to produce these solid polymer electrolyte membranes.

Another object of this invention is to provide novel polymer substrates and ion-conducting materials and novel combinations thereof.

Yet another object of the present invention is to provide SPEMs that are substantially stable to temperatures of at least about 100° C., preferably to at least about 150° C., more preferably to at least about 175° C.

Foster-Miller has discovered that a high performance SPEM, suitable for use in fuel cells, can be produced by interpenetrating a porous polymer substrate with an ion-conducting material to form a composite membrane. This composite ion-conducting membrane will exhibit the strength and thermal stability of the polymer substrate and the ionic conductivity of the ion-conducting material.

The composite SPEM of the present invention comprises a porous polymer substrate that is interpenetrated with an ion-conducting material.

The present invention also provides novel substrates and novel substrate/ion-conducting material combinations. These materials can be tailored and combined to produce membranes useful over a range of operating conditions and/or applications.

Preferred polymer substrates are easily synthesized from commercially-available, low-cost starting polymers, into thin, substantially defect free polymeric films which have high strength even at low thickness (in preferred embodiments less than about 1 mil), outstanding crease/crack resistance and high tear strength. Preferred polymer substrates are substantially chemically resistant to acids, bases, free radicals and solvents (e.g., methanol) and are thermally and hydrolytically stable from temperatures of about 50° C. to 300° C. In preferred embodiments, the polymer substrates are thermally and hydrolytically stable to temperatures of at least about 100° C.

Preferred polymer substrates possess exceptional mechanical properties (much greater than about 2500 psi tensile strength, much less than about 100% elongation to break), dimensional stability, barrier properties (to methanol, water vapor, oxygen and hydrogen) even at elevated temperatures and pressures, and exceptional gauge uniformity (+/− 0.2 mils preferable).

Preferred polymer substrates have a pore size range of 10 Å to 2000 Å more preferably 500 Å to 1000 Å, and have a porosity range from about 40% to 90%.

In some preferred embodiments of the present invention, the polymer substrate of the SPEM comprises a lyotropic liquid crystalline polymer, such as a polybenzazole (PBZ) or polyaramid (PAR or Kevlar®) polymer. Preferred polybenzazole polymers include polybenzoxazole (PBO), polybenzothiazole (PBT) and polybenzimidazole (PBI) polymers. Preferred polyaramid polymers include polypara-phenylene terephthalamide (PPTA) polymers.

In other preferred embodiments, the polymer substrate of the SPEM comprises a thermoplastic or thermoset aromatic polymer. Preferred aromatic polymers include: polysulfone (PSU), polyimide (PI), polyphenylene oxide (PPO), polyphenylene sulfoxide (PPSO), polyphenylene sulfide (PPS), polyphenylene sulfide sulfone (PPS/$SO_2$), polyparaphenylene (PPP), polyphenylquinoxaline (PPQ), polyarylketone (PK) and polyetherketone (PEK) polymers.

Preferred polysulfone polymers include polyethersulfone (PES), polyetherethersulfone (PEES), polyarylsulfone, polyarylethersulfone (PAS), polyphenylsulfone (PPSU) and polyphenylenesulfone ($PPSO_2$) polymers. Preferred polyimide polymers include the polyetherimide polymers as well as fluorinated polyimides. Preferred polyetherketone polymers include polyetherketone (PEK), polyetheretherketone (PEEK), polyetherketone-ketone (PEKK), polyetheretherketone-ketone (PEEKK) and polyetherketoneetherketone-ketone (PEKEKK) polymers.

Some preferred ion-conducting materials for use in the fuel cells of the present invention are easily sulfonated or synthesized from commercially-available, low-cost starting polymers (or monomers), and are swellable, but highly insoluble in boiling water (100° C.) or aqueous methanol (>50%) over extended time periods.

Other preferred ion conducting materials for use in certain fuel cells of the present invention are highly sulfonated polymers that are water soluble at room temperature or at the boiling point of water. Preferred polymers may be prepared, for example, by condensation polymerization of a sulfonated monomer (or optionally copolymerization of one or more additional sulfonated or unsulfonated monomers) or by sulfonation of an unsulfonated or water insoluble sulfonated polymer with one or more highly reactive sulfonation agents. However, any method that will yield highly sulfonated polymers that are water soluble at room temperature may be used to prepare these ion-conducting materials.

Preferred ion-conducting materials have limited methanol permeability (limited methanol diffusivity and solubility) even at elevated temperatures and pressures, are substantially chemically stable to acids and free radicals, and are thermally/hydrolytically stable to temperatures of at least about 100° C. Some preferred ion-conducting materials have an ion-exchange capacity (IEC) of >1.0 meq/g dry membrane (preferably, 1.5 to 2.0 meq/g) and are highly ion-conducting (preferably, from about 0.01 to about 0.5 S/cm, more preferably, to greater than about 0.1 S/cm or <10 Ωcm resistivity). Preferred water soluble ion conducting materials typically have an ion-exchange capacity (IEC) of greater than 2.0 meq/g, and more preferably greater than about 2.5 meq/g. Particularly preferred water soluble ion conducting materials typically have an ion-exchange capacity (IEC) of between about 2.5 and about 5.5 meq/g.

Although not wishing to be bound by theory, it appears that mechanical compression of the water soluble ion conductive polymer present in the pores of the porous polymer support membrane prevents leaching or discharge of the water soluble ion conductive polymer from the membrane. That is, Applicants have surprisingly discovered that the rigidity and consolidation of the support polymer (such as PBO, PBZ, and the like) combined with swelling of the water soluble ion conductive material caused by exposure to water or a humid environment prevents the water soluble ion conductive material from leaching or otherwise being discharged from the composite membrane.

Preferred water insoluble ion-conducting materials are easily cast into films and/or imbibed into the porous polymer substrate. Such films are durable, substantially defect-free, and dimensionally stable (less than about 20% change in dimension wet to dry), preferably even above temperatures of at least about 100° C. Particularly preferred ion-conducting materials have the ability to survive operation in fuel cells (i.e., $H_2/O_2$, methanol) for at least about 5000 hours (e.g., automotive applications).

Preferred water soluble ion-conducting materials are easily imbibed into the porous polymer substrate or are extruded or cast together with a substrate polymer to form a SPEM. Although not wishing to be bound by theory, the structural and dimensional rigidity of the polymer substrate prevents or minimizes dimensional deformation of the SPEM caused by solvation and/or swelling of the water soluble ion-conducting material. Such films are durable, substantially defect-free, and dimensionally stable (less than about 20% change in dimension wet to dry), preferably even above temperatures of at least about 100° C. Particularly preferred ion-conducting materials have the ability to survive operation in fuel cells (i.e., $H_2/O_2$, methanol) for at least about 5000 hours (e.g., automotive applications).

In one preferred embodiment of the present invention, the ion-conducting material of the SPEM comprises a sulfonated, phosphonated, carboxylated or sulfonimidated ion-conducting aromatic polymer. For example, it may comprise a sulfonated derivative of at least one of the above-listed thermoset or thermoplastic aromatic polymers. It may also comprise a sulfonated derivative of a polybenzazole or polyaramid polymer.

In an alternate embodiment, the ion-conducting material of the SPEM of the present invention comprises a non-aromatic polymer, such as a perfluorinated ionomer. Preferred ionomers include carboxylic, phosphonic, sulfonimidic or sulfonic acid substituted perfluorinated vinyl ethers.

Other preferred ion-conducting materials for use in the present invention include polystyrene sulfonic acid (PSSA), polytrifluorostyrene sulfonic acid, polyvinyl phosphonic acid (PVPA), polyvinyl carboxylic acid (PVCA) and polyvinyl sulfonic acid (PVSA) polymers, and metal salts thereof.

In yet other embodiments of the invention, the water soluble ion conductive material of the SPEM comprises a condensation polymer of a diaryl sulfone monomer and a diol or di-thiol monomer where at least one of the monomers is sulfonated prior to polymerization.

Substrate and ion-conducting materials for use in the present invention may be substituted or unsubstituted and may be homopolymers, copolymers of the polymers listed above, or other blends. Any desired substituents may be incorporated into the classes of substrate and ion-conducting polymers described herein for use in the present invention, provided that such substituents do not substantially impair the properties desired for the intended use of the polymer, as may readily be determined by one of ordinary skill in the art. Such properties may include ionic conductivity, chemical and structural stability, swelling properties and so forth. Blends could be of sulfonated (substituted) polymers or substituted/unsubstituted polymers.

The utility of blending polymers for the ion-conducting or the substrate polymers is in optimizing each of their properties. Unlike simple mixing, blending does not create a composite material with two dispersed components. Rather, the blend is uniform in composition throughout. In the case of ion-conducting polymers, it might be useful to blend a sulfonated polymer with an unsulfonated one to optimize swelling, fuel crossover resistance, conductivity, peroxide resistance, hydrolytic stability and the like. Similarly, the blending of two sulfonated polymers might allow improved properties over each individual component. This concept can be extended to the substrate polymer, whereby blending may allow improvements in strength, cost, processability, or stability.

Representative formulae of unsubstituted polymers can be found in Tables 1 to 4 at the end of the Detailed Description of the Invention.

Following selection of a suitable polymer substrate and ion-conducting material in accordance with criteria set forth herein, one preferred method of fabricating a membrane of the present invention comprises the following steps: solubilizing the water soluble ion-conducting material in water, preparing a porous substrate membrane in a water swollen state, imbibing the water swollen substrate with the ion-conducting material via solution infiltration (such that the microinfrastructure of the porous polymer substrate is substantially interpenetrated with the ion-conducting material). Upon water evaporation and drying, the microporous substrate will collapse locking the ion-conductor within the microinfrastructure of the polymer substrate. Post imbibing steps may include tension drying, stretching and hot pressing of the composite membrane. The substrate provides mechanical and chemical stability, while the ion-conductor provides a high-flux proton path. The SPEMs of the present invention also act as a barrier against fuel ($H_2$ and methanol) and oxidizer ($O_2$) permeation in fuel cell applications.

An analogous membrane fabrication method may be followed using water insoluble ion-conducting material by dissolving said material in a nonaqueous organic solvent, and then solvent exchanging the water swollen porous substrate membrane with that same organic solvent before proceeding to imbibe said substrate with the solution of ion-conducting material.

Another preferred method of producing the membranes of the present invention comprises the steps of preparing a mixture of the polymer substrate and the ion-conducting material in a common solvent and extruding or casting a composite membrane from the mixture. The coprocessing methods of membrane preparation are suitable for use with water soluble and water insoluble ion-conducting materials.

Preferred solvents for use in these various methods include water, tetrahydrofuran (THF), dimethylacetamide (DMAc), dimethylformamide (DMF), dimethylsulfoxide (DMSO), N-Methyl-2-pyrrolidinone (NMP), sulfuric acid, phosphoric acid, chlorosulfonic acid, polyphosphoric acid (PPA) and methanesulfonic acid (MSA). PPA and MSA are preferred solvents for a polymer substrate and ion-conducting material combinations of PBO/sulfonated PPSU or PBZ/sulfonated PPSU.

Another method of producing a membrane of the present invention comprises the steps of sulfonating the pores of the polymer substrate with a sulfonating agent.

Still another method for producing a composite membrane of the present invention comprises the steps of preparing the substrate polymer and subsequently impregnating the substrate with appropriate monomers which are then polymerized in-situ to form the composite SPEM.

Yet another method of producing a membrane of the present invention comprises the steps of preparing a mixture of a polymer substrate material and an ion-conducting material and extruding a composite film directly from the mixture.

The membranes of the present invention are useful in a variety of electrochemical devices, including fuel cells, electronic devices, systems for membrane-based water electrolysis, chloralkali electrolysis, dialysis or electrodialysis, pervaporation or gas separation.

The foregoing and other objects, features and advantages of the invention will become better understood with reference to the following description and appended claims.

DETAILED DESCRIPTION OF THE INVENTION

The composite membranes of the present invention are designed to address the present shortcomings of today's solid polymer electrolyte membranes, specifically Nafion® and other like membranes (e.g., Gore-Select®).

The present invention provides a relatively low cost, composite solid polymer electrolyte membrane (SPEM), with improved power density and reduced sensitivity to carbon monoxide in hydrogen fuel. It may also alleviate water management problems which limit the efficiency of present Nafion® membrane-based fuel cells.

The composite membranes of the present invention may be employed in various applications, including but not limited to, polarity-based chemical separations; electrolysis; fuel cells and batteries; pervaporation; reverse osmosis—water purification, gas separation; dialysis separation; industrial electrochemistry, such as choralkali production and other electrochemical applications; water splitting and subsequent recovery of acids and bases from waste water solutions; use as a super acid catalyst; use as a medium in enzyme immobilization, for example; or use as an electrode separator in conventional batteries.

The composite SPEMs of the present invention comprise a porous polymer substrate interpenetrated with an ion-conducting material. The porous polymer substrate serves as a mechanically, thermally, chemically and oxidatively durable support for the ion-conducting material, e.g., polymer. Ion-conducting polymers (ICPs) with very high ion-exchange capacities (preferably, IEC>1.0 meq/g; more preferably, IEC>2.5 meq/g) can be used in SPEMs of the present invention, since the strength properties of the ICP are not needed for membrane mechanical integrity.

The porous polymer substrate is characterized by a microinfrastructure of channels that have substantially uniform, unchanging dimensions (Tg is higher than use temperature). That is, the substrate material will not flow, since the fuel cell operating temperature is less than the Tg of the substrate. The ion-conducting polymer substantially interpenetrates the microinfrastructure of the porous polymer substrate. This configuration, which can be made quite thin, promotes efficient proton transport across the membrane and minimizes water management problems. As a consequence, eventual membrane dehydration, parasitic losses and loss of ionic conductivity can be substantially prevented.

Preferably, thermally stable, wholly aromatic polymers are used in producing the composite membranes of the present invention, but any material(s) meeting the following requirements may generally be used: low cost, high ionic conductivity, electronically insulating, impermeable to fuel and oxidizer ($H_2$, $O_2$, methanol) at elevated temperatures and pressures in fuel cell applications, chemically resistant to acids and free radicals, Tg above fuel cell operating temperature (at least about 175° C. is preferred), resistance to puncture or burst during operation at high temperatures and pressures, and maintenance of ionic conductivity at elevated/high operating temperatures.

The selection criteria for polymer substrates and ion-conducting materials suitable for SPEMs of the present invention are described below. Structures for preferred polymer substrates and ion-conducting polymers are indicated in Tables 1 to 4 which appear at the end of this section.

Preferred polymer substrates are easily synthesized from commercially-available, low-cost starting polymers, into thin, substantially defect free polymeric films which have high strength even at low thickness (preferably less than about 1 mil), outstanding crease/crack resistance and high-tear strength. Preferred polymer substrates are substantially chemically resistant to acids, free radicals and solvents (i.e., methanol) and are thermally and hydrolytically stable from temperatures of about 50° C. to 300° C. Preferred polymer substrates possess exceptional mechanical properties (much greater than about 2500 psi tensile, much less than about 100% elongation to break), dimensional stability, barrier properties (to methanol, water vapor, oxygen and hydrogen) even at elevated temperatures and pressures and exceptional gauge uniformity (+/−0.2 mils preferable). In preferred embodiments, the polymer substrates are thermally and hydrolytically stable to temperatures of at least about 100° C.

Preferred polymer substrates have a pore size range of about 10 Å to about 20000 Å more preferably about 10 Å to about 2000 Å or between about 500 Å to about 1000, and have a porosity range from about 40% to 90%.

In some preferred embodiments of the present invention, the porous polymer substrate of the SPEM comprises a lyotropic liquid crystalline polymer, such as a polybenzazole (PBZ) or polyaramid (PAR or Kevlar®) polymer. Preferred polybenzazole polymers include polybenzoxazole (PBO), polybenzothiazole (PBT) and polybenzimidazole (PBI) polymers. Preferred polyaramid polymers include polypara-phenylene terephthalamide (PPTA) polymers. Structures of the above-mentioned polymers are listed in Table 1. Certain preferred polybenzazole polymer substrate comprises an alternating structure comprising an optionally substituted phenyl or naphthyl group and a repeat unit selected from benzoxazole, benzothiazole, diimidazo-pyridine, and benzimidazole.

In other preferred embodiments, the porous polymer substrate of the SPEM comprises a thermoplastic or thermoset aromatic polymer. Preferred groups of these aromatic polymers include the following: polysulfone (PSU), polyimide (PI), polyphenylene oxide (PPO), polyphenylene sulfoxide (PPSO), polyphenylene sulfide (PPS), polyphenylene sulfide sulfone ($PPS/SO_2$), polyparaphenylene (PPP), polyphenylquinoxaline (PPQ), polyarylketone (PK) and polyetherketone (PEK) polymers.

Preferred polysulfone polymers include polyethersulfone (PES), polyetherethersulfone (PEES), polyarylsulfone, polyarylethersulfone (PAS), polyphenylsulfone (PPSU) and polyphenylenesulfone ($PPSO_2$) polymers. Preferred polyimide polymers include the polyetherimide polymers and fluorinated polyimides. Preferred polyetherketone polymers include polyetherketone (PEK), polyetheretherketone (PEEK), polyetherketone-ketone (PEKK), polyetheretherketone-ketone (PEEKK) and polyetherketoneetherketone-ketone (PEKEKK) polymers. The structures of the above polymers are listed in Tables 2 and 3 below.

More preferably, the porous polymer substrate comprises a lyotropic liquid crystal polymer. Most preferably, the porous polymer substrate comprises a lytotropic liquid crystal poly (bisbenzoxazole) polymer (PBZ), such as a PBO, PBT, or PBI.

The PBZ polymers are members of a class of polymeric materials collectively referred to as ordered polymers. As a result of this rigid rod-like molecular structure, PBZ polymers form liquid crystalline solutions from which extremely strong, stiff fibers and films have been processed. When the PBZ polymers are in a dry (entirely collapsed) form, they have the following characteristics: high strength and dimensional stability, superior barrier (gaseous) properties, excellent crease/crack resistance, excellent tear strength, and superior thermal and hydrolytic temperature stability (>300° C.).

Film-forming processes involve several operations in which a PBZ polymer solution in polyphosphoric acid undergoes a succession of structural changes, leading to the final product form. One basic process for producing PBZ products includes extrusion of the polymer substrate solution (polymer and acid solvent), coagulation to lock-in the microstructure, washing to remove the acid solvent, and drying (at high temperatures) to remove the exchanged water and consolidate the polymer into the end product.

In the coagulation stage, a liquid to solid phase transition is induced by diffusion of a non-solvent (water) into the PBO solution. During this phase transition cycle, the final structure of the solid is established. It is believed that the structure formed during the coagulation stage of PBO fiber and film is an interconnected network of highly oriented microfibrils of 80 Å to 100 Å diameter. Such films have been dried under tension in order to produce high tensile properties.

During the drying process, the micropores present as spaces between microfibrils in PBO film undergo substantial shrinkage decreasing in dimensions from several thousand Angstroms (e.g., 2000 Å) in size to less than 10 Å in size for the dried, heat-treated PBO film. The final pore size depends highly upon the heat treatment methods employed.

In forming a porous polymer substrate for the present invention, instead of drying the water from the network, the water is replaced by the desired ion-conducting material. It has been discovered that a high performance PBO fuel cell membrane can be produced by interpenetrating or infusing the interior porosity of water-swollen PBO films with concentrated or dilute solutions of ion-conducting polymers, such as Nafion® or polyethersulfone sulfonic acid. For example, after the coagulated PBO film has been infiltrated with a Nafion® solution, the Nafion® regions within the pores (and coating on the surface) of the film will form a highly ionically-conducting gelatinous Nafion® membrane supported by the porous PBO membrane substrate. Such SPEMs exhibit the strength and thermal stability of PBO and the excellent ionic conductivity of water-swollen Nafion® copolymer.

The usual deficiencies of Nafion®, such as membrane weakness and softening at elevated temperatures, are improved by the PBO substrate to support against compression while simultaneously providing sufficient porosity to allow for adequate water content, thus enabling high proton transport. In preferred embodiments, the substrate will accommodate about 40 to about 90 volume percent, preferably about 70 to about 80 volume percent, of ion-conducting polymer.

During composite membrane fabrication, the following problems may be encountered: substrate film delamination, imbibition of an insufficient amount of ion-conducting material inside the porous substrate and/or inability to maintain, if desired, a smooth outer layer of ion-conducting polymer for proper electrode bonding. These problems may be overcome by heating of the ion-conducting polymer solution during imbibition into the substrate (which decreases the solution viscosity and swells the pores of the substrate) and using less oriented films (which allows more ion-conducting material into the substrate).

As noted above, a second preferred polymer substrate comprises a PES polymer. PES is a high use temperature amorphous thermoplastic that exhibits long-term stability at elevated temperature (>175° C.). The microporous PES substrate represents a new class of high performance fuel cell membranes that can be used to solve the difficulties inherent in current Nafion® membranes as discussed above.

PES is readily available from Amoco Polymers, Inc. in Alpharetta, Ga., USA, in large quantity at low cost. This polymer exhibits the combination of desirable properties required for efficient function at much higher temperatures and pressures than are now possible (potentially greater than about 175° C. temperature and greater than about 100 psi gas pressure).

Microporous PES films for use in the SPEMs of the present invention can be produced via standard film casting techniques or purchased directly from appropriate vendors. As with other suitable polymer substrates, in one preferred embodiment, PES is dissolved in an appropriate water-miscible solvent to a predetermined concentration. A solution of PES is selected to produce a film with high porosity. The PES solution is then cast onto glass plates to form a film, e.g., about 10 mils thick. Immersion of the plates in water coagulates the polymer and leaches out the solvent forming the microporous substrate membrane in a water swollen state. The ion-conducting polymer can then be introduced into the microporous voids of the water swollen PES substrate membrane using solvent exchange processes to form the composite membrane. Alternatively, the membrane can be dried first and then infiltrated with the ion-conducting solution using vacuum to remove air bubbles and fill the pores with ion-conducting polymer. The membrane may also be produced by an extrusion process as described herein.

Certain preferred ion-conducting polymers for use in the present invention are easily sulfonated or synthesized from commercially-available, low-cost starting polymers, and are swellable, but highly insoluble in boiling water (100° C.) or aqueous methanol (>50%) over extended time periods. These preferred ion-conducting polymers have limited methanol permeability (limited methanol diffusivity and solubility) even at elevated temperatures and pressures, are substantially chemically stable to acids and free radicals, and thermally/hydrolytically stable to temperatures of at least about 100° C. These same preferred ion-conducting polymers have an ion-exchange capacity (IEC) of >1.0 meq/g dry membrane (preferably, 1.5 to 2.0 meq/g) and are highly ion-conducting (preferably, from about 0.01 to about 0.5 S/cm, more preferably, to greater than about 0.1 S/cm or <10 Ωcm resistivity). Preferred ion-conducting polymers are easily cast into films and/or imbibed into the polymer substrate. Such films are durable, substantially defect-free, and dimensionally stable (less than about 20% change in dimension wet to dry) even above temperatures of at least about 100° C. Preferred ion-conducting polymers have the ability to survive operation in fuel cells (i.e., $H_2/O_2$, methanol) for at least about 5000 hours (e.g., automotive applications).

Certain other preferred ion-conducting polymers for use in the present invention are easily sulfonated or synthesized from commercially-available, low-cost sulfonated monomers, and are soluble in water at temperatures between room temperature (e.g., about 10-20° C.) and boiling (e.g., at least 100° C.). Preferred water soluble ion-conducting polymers have limited methanol permeability (limited methanol diffusivity and solubility) even at elevated temperatures and pressures, are substantially chemically stable to acids and free radicals, and thermally/hydrolytically stable to temperatures of at least about 100° C. Preferred water soluble ion-conducting polymers have an ion-exchange capacity (IEC) of >2.0 meq/g dry membrane (preferably, >2.5 meq/g or in a range of about 2.5 to about 5.5 meq/g) and are highly ion-conducting (preferably, from about 0.01 to about 0.5 S/cm, more preferably, to greater than about 0.1 S/cm or <10 Ωcm resistivity). Preferred water soluble ion-conducting polymers are easily cast into films and/or imbibed into the polymer substrate. Such films are durable, substantially defect-free, and dimensionally stable even above temperatures of at least about 100° C. Preferred water soluble ion-conducting polymers have the ability to survive operation in fuel cells (i.e., $H_2/O_2$, methanol) for at least about 5000 hours (e.g., automotive applications). Other preferred water soluble ion conducting polymers swell in water or humid environments such that the polymer is compressed within the structurally rigid pores of the dimensionally rigid porous polymer substrate.

Preferred composite solid polymer electrolyte membranes (SPEM) comprising a porous polymer substrate interpenetrated with a water soluble ion-conducting material, which are provided by the invention, include those in which (i) the porous polymer substrate comprises a homopolymer or copolymer of a liquid crystalline polymer or a solvent soluble thermoset or thermoplastic aromatic polymer, and (ii) the ion-conducting material comprises a water soluble homopolymer or water soluble copolymer of at least one of a sulfonated, sulfonimidated, phosphonated or carboxylated ion-conducting aromatic polymer, a partially fluorinated ionomer or a perfluorinated ionomer.

Other preferred water soluble ion-conducting polymers comprise a sulfonated derivative of at least one of a polysulfone (PSU), polyphenylsulfone (PPSU), polyphenylene oxide (PPO), polyphenylene sulfoxide (PPSO), polyphenylene sulfide (PPS), polyphenylene sulfone (PPSO2), polyphenylene sulfide sulfone ($PPS/SO_2$), polyparaphenylene (PPP), polyphenylquinoxaline (PPQ), polyarylketone (PK), polyetherketone (PEK), polybenzazole (PBZ) and polyaramid (PAR) polymer.

In certain preferred embodiments, the SPEM comprises a water soluble ion-conductive polymer selected from:

(i) a water soluble ion-conductive polysulfone polymer comprises at least one of a polyethersulfone (PES), polyetherethersulfone (PEES), polyarylsulfone, polyarylethersulfone (PAS), polyphenylsulfone (PPSU) and polyphenylenesulfone ($PPSO_2$) polymer, (ii) a polybenzazole (PBZ) polymer.

Other preferred water soluble ion-conductive polymers suitable for use in the SPEM provided herein include ion-conducting polymers selected from a polystyrene sulfonic acid (PSSA), poly(trifluorostyrene) sulfonic acid, polyvinyl phosphonic acid (PVPA), polyacrylic acid and polyvinyl sulfonic acid (PVSA) polymer.

Yet other preferred SPEMs of the invention comprising a water soluble ion-conductive polymer include those SPEMs in which the porous polymer substrate comprises a homopolymer or copolymer of at least one of a substituted or unsubstituted polybenzazole polymer, and the ion-conducting material comprises a sulfonated derivative of a homopolymer or copolymer of at least one of a polysulfone (PSU), polyphenylene sulfoxide (PPSO) and polyphenylene sulfide sulfone ($PPS/SO_2$) polymer. More preferably, the polysulfone polymer comprises at least one of a polyethersulfone (PES) and polyphenylsulfone (PPSU) polymer.

Typically preferred polysulfone polymers suitable for use in SPEMs of the invention are prepared by condensation of (4,4'-dihalophenyl)sulfone, sulfonated (4,4'-dihalophenyl) sulfone or a mixture thereof with 4,4'-biphenol, 4,4'-biphenyl-dithiol, 1,4-hydroquinone, 1,4-benzene dithiol, and mixtures thereof, each of which may be optionally sulfonated. Typically, at least about 70% of the (4,4'-dihalophenyl)sulfone monomers incorporated into the condensation polymer are sulfonated at the 3 and 3' position. More preferably, at least about 75%, about 80%, about 85%, about 90%, about 95% of the (4,4'-dihalophenyl)sulfone monomers incorporated into the condensation polymer are sulfonated or substantially all of the (4,4'-dihalophenyl)sulfone monomers incorporated into the condensation polymer are sulfonated.

In certain embodiments, preferred water-soluble sulfonated polysulfone polymers which are suitable for use as an ion-conductive polymer in the SPEMs of the invention include those polysulfone polymers of Formula I:

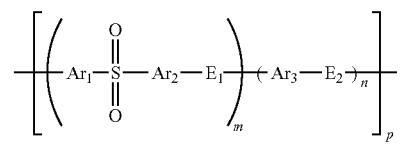

wherein $Ar_1$, $Ar_2$, and $Ar_3$ are independently selected at each occurrence from carbocyclic aromatic groups having between 6 and 18 carbon ring atoms and between 1 and 3 rings; and at least a portion of the $Ar_1$, $Ar_2$, and $Ar_3$ groups are substituted with sulfonic acid residues;

each occurrence of $E_1$ and $E_2$ is independently selected from the group consisting of O, S, and $SO_2$;

$m \geq 1$;

n is an integer of between 0 and about 10; and p is an integer of between 2 and about 10,000.

Certain particularly preferred compounds of Formula I, include polymers in which each of $Ar_1$, $Ar_2$, and $Ar_3$ are phenylene, or more preferably para-phenylene, and at least a portion of the $Ar_1$, $Ar_2$, and $Ar_3$ groups is substituted by one or more sulfonic acid residues. In certain embodiments, preferred polymers of Formula I include those in which each $Ar_1$, $Ar_2$, and $Ar_3$ is a para-phenylene residue having at least one sulfonic acid residue, or more preferably one sulfonic acid residue per phenylene ring. Other preferred polymers of Formula I include those in which each $Ar_1$ and $Ar_2$ is a para-phenylene residue having at least one sulfonic acid residue, or more preferably one sulfonic acid residue per phenylene ring and $Ar_3$ is a phenylene residue, or more preferably a para-phenylene residue which is not substituted by an acidic functional group.

In certain preferred embodiments $E_1$ and $E_2$ are both oxygen or $E_1$ and $E_2$ both sulfur. Other preferred polymers of Formula I include those polymers in which each repeat unit comprises oxygen at either $E_1$ or $E_2$ and sulfur or $SO_2$ at the non-oxygen $E_1$ or $E_2$.

Preferred polysulfone polymers of Formula I include those polysulfones provided by Formula II:

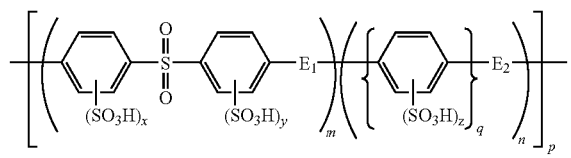

II wherein x, y, and z are integers of between 0 and 4, which are independently selected at each occurrence of x, y or z in the formula, wherein at least a portion of the occurrences of x, y and z is not zero;

each occurrence of $E_1$ and $E_2$ is independently selected from the group consisting of O, S, and $SO_2$;

$m \geq 1$;

n is an integer of between 0 and about 10;

p is an integer of between 2 and about 1,000; and q is 1, 2, or 3.

Preferred polymers of Formula II include those in which p is an integer of between about 5 and about 5000 or more preferably between about 5 and about 2500, between about 5 and about 2000, between about 5 and about 1500 or between about 5 and about 1000. Certain preferred polymers of Formula II include those in which the value of p is more than about 5, more than about 10 or more than about 20. Particularly preferred polysulfones of Formula II include those in which p is an integer of between about 5 and about 500.

Other preferred polymers of Formula II include those in which z is less than 1, or more preferably z is zero, and at least about 70% of the occurrences of x and y are not zero. More preferably, at least about 75%, at least about 80%, at least about 85%, at least about 90%, at least about 95%, or about 100% of the occurrences of x and y are not zero. In certain preferred polymers of Formula II, x=y=1 and z=0 or x=y=z=1.

Preferred ion-conducting polymers, including preferred water soluble and water insoluble ion-conducting polymers, are substantially chemically stable to free radicals. The peroxide ($H_2O_2$) screening test serves as an accelerated fuel cell life test. The test simulates long term fuel cell operation by exposing the subject aqueous ion-conducting membrane to a peroxide/iron solution at 68° C. for 8.0 hours. Under these conditions, aggressive hydroperoxide (HOO—) radicals are produced. It has been shown that these radicals are formed during normal $H_2/O_2$ fuel cell operation, and are the prominent membrane degradation mechanism.

There are several methods to improve the long term stability (aqueous hydroperoxide radical) of PPSU (and other ion-conducting polymers in accordance with this invention).

For example, the stability of the ion-conducting polymer may be enhanced by several post-processing steps. These steps include the following: (i) cross-linking the ion-conducting polymer in the H+ form to develop sulfone crosslinks; (ii) addition of small amounts of antioxidants (insoluble) into the ion-conducting polymer; and (iii) chlorination/bromination of the ion-conducting polymer backbone, thereby reducing degradation sites.

Crosslinking methods can provide or enhance peroxide stability. Additionally, various procedures are described in the literature wherein sulfonated polymers can be crosslinked to further enhance the barrier properties of the ion-conducting polymer. See e.g., U.S. Pat. No. 5,795,496; Kerres, et al., "New Ionomers and their Applications in PEM Fuel Cells", ICE, Stuttgart, Germany (1996); and Kerres, et al., *J. Membrane Sci.* 139:211-225 (1998).

For example, U.S. Pat. No. 5,795,496 describes a method of crosslinking ion-conducting polymers via the $SO_3H$ groups (sulfonic acid groups) to form sulfone crosslinks between polymer chains. This method entails sulfonating the polymer (e.g., PEEK) using concentrated sulfuric acid, casting of a film, then heating the film to a temperature of 120° C. under vacuum. It is the heating step which causes the crosslinking to occur. Despite the enhanced barrier properties provided by crosslinking, this crosslinking procedure results in decreased ionic conductivity, water adsorbtion and swelling of the polymer. However, adjustments can be made to the crosslinking procedures employed in order to minimize the sacrifice of ionic conductivity.

Such crosslinking procedures can also be advantageously used to further stabilize the composite membranes of this invention that incorporate water soluble ion-conducting polymers by rendering said polymers less soluble and swellable by water.

The use of additives can also provide or enhance peroxide stability. Polymer additives have been evaluated that can be used as radical scavengers within the ion-conducting component of the SPEMs of the present invention. Examples of these include Irganox 1135 (Primary Phenolic Antioxidant, commercially available from Ciba Geigy) and DTTDP (Di (tridecyl) Thiodipropionate, Secondary Antioxidant, commercially available from Hampshire). In addition, the ion-conducting component polymer can be crosslinked via heating to slow membrane degradation.

Chlorination or bromination of the sulfonated polymer (polymeric backbone) also may be used to increase the usable lifetime of the ion-conducting polymer. The combination of reduction in active sites and increased electron withdrawing properties of such reactions may be beneficial to lessening membrane degration.

Additionally, various methods may be employed to purify the ion-conducting material to optimize or enhance its properties and long-term stability. For example, for a water insoluble ion conducting polymer, the ion-conducting material (e.g., sulfonated PPSU) may be re-dissolved in a solvent (e.g., NMP), and re-precipitated into water or saturated NaCl solution. This is especially useful in combination with sulfonation methods which produce a heterogeneous sulfonated ion-conducting polymer. Specifically, this procedure has been shown to effectively remove overly sulfonated or degraded fractions of ion-conducting polymers.

In one preferred embodiment of the present invention, the ion-conducting material of the SPEM comprises a sulfonated ($SO_3H$), phosphonated ($PO(OH)_2$), sulfonimidated ($SO_2N(H)SO_2CF_3$), or carboxylated (COOH) aromatic polymer. For examples of phosphonates, see *Solid State Ionics*, 97 (1997), 177-186. For examples of carboxylated solid polymer electrolytes, see *Solid State Ionics*, 40:41 (1990), 624-627. For examples of sufonimide-based solid polymer electrolytes, ses *Electrochemical and Solid State Letters*, 2(9): (1999), 434-436. For example, the ion-conducting material may comprise a sulfonated derivative of at least one of the above-listed thermoset or thermoplastic aromatic polymers. It may also comprise a sulfonated derivative of a polybenzazole or polyaramid polymer.

Though sulfonated polymers are not readily available in industry, the synthesis of such polymers is well known to the skilled artisan and can be found in various patents and publications. See for example, U.S. Pat. Nos. 4,413,106, 5,013,765, 4,273,903 and 5,438,082, Linkous, et al., *J. Polym. Sci.* Vol. 86: 1197-1199 (1998), and Wang, et al, *J. Memb. Sci.* Vol. 197: 231-242 (2002).

In an alternate embodiment, the ion-conducting material of the SPEM of the present invention comprises a non-aromatic polymer, such as a perfluorinated ionomer. Preferred ionomers include carboxylic, phosphonic, sulfonimidic or sulfonic acid substituted substituted perfluorinated vinyl ethers.

Other preferred ion-conducting materials for use in the present invention include polystyrene sulfonic acid (PSSA), polytrifluorostyrene sulfonic acid, polyvinyl phosphonic acid (PVPA), polyvinyl carboxylic acid (PVCA) and polyvinyl sulfonic acid (PVSA) polymers, and metal salts thereof.

More preferably, the ion-conducting material comprises a sulfonated derivative of a polyphenylsulfone (PPSU), polyethersulfone (PES), polyimide (PI), polyphenylene sulfoxide (PPSO) and polyphenylenesulfide-sulfone ($PPS/SO_2$). These polymers and additional preferred polymers are listed in Table 4.

In order to facilitate interpenetration of the ion-conducting polymer into the pores of the polymer substrate, surfactants or surface active agents having a hydrophobic portion and hydrophilic portion may be utilized in promoting the interpenetration of the ion-conducting polymer into the pores of the polymer substrate. These agents are well known in the art and include Triton X-100 (commercially available from Rohm & Haas of Philadelphia, Pa.).

Compatibilizers may also be employed in producing composite membranes of the present invention. As used herein, "compatibilizers" refer to agents that aid in the blendability of two or more polymers that would otherwise be resistant to such blending. Examples include block copolymers containing connecting segments of each component. These include both potential substrate and/or ion-conducting polymer components.

The SPEMs and methods of the present invention will be illustrated by specific combinations of polymer substrates and ion-conducting polymers. However, the present invention should not be construed as being limited in use to any particular polymer substrate or ion-conducting material. Rather, the present teachings are suitable for any polymer substrate and ion-conducting material meeting the criteria set forth herein.

Several different innovative methods have been developed for producing the solid polymer electrolyte membranes of the present invention by providing a polymer substrate interpenetrated with an ion-conducting polymer. Each method is lower in cost and higher in efficiency than current methods of producing Nafion® (or Nafion®-like) membranes. These methods include imbibing a porous substrate membrane with an ion-conducting material, casting a composite membrane from a common solvent, sulfonating the pores of a suitable polymer substrate to form a composite SPEM of the present invention, polymerization of the ion-conducting polymer (in-situ) within the pores of the porous substrate, and extruding a composite film directly from the mixture of a polymer substrate and ion-conducting material.

In the first method a porous membrane having the desired pore size and pore content is made using a suitable polymer substrate, e.g., PBO. Either casting or extrusion processes are utilized to produce these solvent-swollen membranes as described above. The pores of the porous polymer substrate membrane are then interpenetrated with a solution of ion-conducting polymer. The porous membrane is then dried (in vacuum if necessary) to produce a high ionically conducting interpenetrated matrix within the micropores and as thin coatings on the surfaces of the composite membrane. The flexible, pressure-resistant, high Tg, porous substrate provides puncture and crush-resistance to the thin coating of ion conductor membrane and also to the ion conducting polymer-filled micropores even at temperatures above 175° C. (PBO has no Tg).

Composite membrane proportions are controlled during the imbibing processes by varying the % wt. of ion-conducting material in solution producing a membrane with the target mechanical properties and ionic conductivity.

In one preferred embodiment, the substrate polymer is dissolved in an appropriate water-miscible solvent to a predetermined concentration. The wt. % solution of polymer substrate is selected to produce a film with high pore volume (preferably >80%). The polymer substrate solution is then cast onto glass plates. Immersion of the plates in water coagulates the polymer and leaches out the solvent forming the microporous substrate membrane in a water swollen state. Ion-conducting polymers can then be introduced into the microporous voids of the substrate membrane using solvent exchange processes to form the composite membrane. Alternatively, with some substrate polymers, the membrane can be dried first and then infiltrated with Nafion® or other ICP solution using vacuum to remove air bubbles and fill the pores with Nafion®. The membrane may also be produced by an extrusion process as described herein.

In a second preferred embodiment of the invention, porous polymer substrate membranes containing an ion-conducting material can also be produced by casting the membranes from a common solution containing appropriate concentrations of the polymer substrate and ion-conducting material. Determination of % wt. ion conductor/% wt. substrate are based on the desired final thickness, % volume of ion-conducting polymer and the particular polymers employed. In some instances, this process may produce composite membranes in which the ion-conducting polymer domain sizes are smaller and more uniform than in composite membranes produced by imbibing pre-formed porous substrate membranes. In this process, pore size and content can be more easily controlled in the membrane by adjustment of individual component concentrations. The % wt. of the solution is adjusted to obtain the desired composite. In some other instances, a single phase membrane may be produced in which the substrate polymer and the ion-conducting polymer form a homogeneous complex. Preferred cosolvents include, but are not limited to, the following: tetrahydrofuran (THF), dimethylacetamide (DMAc), dimethylformamide (DMF), dimethylsulfoxide (DMSO), N-Methyl-2-pyrrolidinone (NMP), sulfuric acid, phosphoric acid, chlorosulfonic acid, polyphosphoric acid (PPA) and methanesulfonic acid (MSA). PPA and/or MSA are preferred solvents for a polymer substrate and ion-conducting material combination of PBZ with a variety of sulfonated aromatic polymers.

In a third preferred embodiment of this invention, a polymer substrate is chemically sulfonated to produce a sulfonated composite in situ. This concept draws on a number of technologies. A variety of methods exist for the fabrication of porous polymer films, most centered around dissolving a polymer within a water miscible solvent. A freshly cast film is then soaked in water causing the polymer to precipitate from solution. This phase separation of the solvent and the polymer causes the formation of the porous network as the solvent is leached into the water. One example would be the formation of the PBO polymer substrate, but this can be extended to a large number of polymers. One typical method for sulfonating polymers is direct exposure to concentrated sulfuric acid (esp. at elevated temperatures). Imbibing a sulfuric acid solution into the porous polymer network, followed by rapid heating to high temperatures (250-350° C.) has been used to sulfonate some polymeric systems. If a dilute acid solution is used, the polymer will not dissolve in the sulfonating process. As a result, only the surface within the porous network will be sulfonated. The product is a composite structure of unsulfonated polymer with sulfonated polymer on the surface.

In a fourth preferred embodiment, a method for producing a composite membrane of the present invention comprises the steps of preparing the substrate polymer and subsequently impregnating the substrate with appropriate monomers which are then polymerized in-situ to form the composite SPEM. This concept also draws on a number of well known interpenetrating network (IPN) technologies. See e.g., IPNs Around the World, 1997, John Wiley & Sons. The porous substrate polymer can be produced as described in the third preferred embodiment above. Alternatively, a preformed porous substrate with the desired properties can be purchased from industry (i.e., Osmonics, Gelman, Memtec, Pall Filtron). For example, Memtec offers a highly asymmetric polysulfone membrane. The preformed substrate can then be imbibed with monomers required to synthesize ion-conducting polymers within the pores of the substrate. Of course, the substrate material must be chemically and thermally stable to the polymerization solvents and/or reaction conditions. Once polymerized, an IPN membrane is created that has properties in accordance with the composite SPEMs of the present invention. Further, crosslinking may be used to control swelling in the SPEM as required.

In a fifth preferred embodiment, a solid polymer electrolyte composite membrane of the present invention can be made by preparing a mixture of a polymer substrate and an ion-conducting polymer and extruding or casting a composite film directly from this mixture.

One way to realize the direct extrusion of a solid polymer electrolyte composite membrane without imbibing a porous polymer substrate with an ion-conducting polymer solution would be the fine dispersion of one component in a solution of the other. Provided the solvent used would only dissolve one of the components, a composite could be obtained by extruding or casting this physical mixture of the components followed by removal of the solvent.

Another possibility would be the dissolution of both components in a common solvent. A composite membrane would be formed with the phase separation of the components, either before or after the removal of the solvent. Similarly, many polymers can be uniformly blended in the melt (e.g. without solvent). However, upon cooling the components may phase separate into the appropriate interpenetrating network (IPN)-type structure. This last method would also be useful from the standpoint that no solvent is required. Other possible examples where these methods could be used include blending of sulfonated and unsulfonated versions of one polymer in either a common solution or in the high temperature melt, followed by their phase separation upon cooling or removal of solvent. For example, a typical solution of PBO in polyphosphoric acid would dissolve the sulfonated PBO ion-conducting polymer.

Alternatively, substrate and ion-conducting polymers processed together from a common solution or melt may yield a composite PEM of a single homogeneous phase having enhanced properties in comparison to those of the ion-conducting material alone.

Optimal interpenetration of the polymer substrate by the ion-conducting polymer is estimated to be in the range of 40-90% volume. More preferably, interpenetration is in the range of 50-80% volume. Percent values can be determined by comparing the thickness of a membrane infiltrated with ion-conducting polymer with a control membrane with no infiltration. For example, a doubling in thickness would indicate 50% interpenetration.

TABLE 1

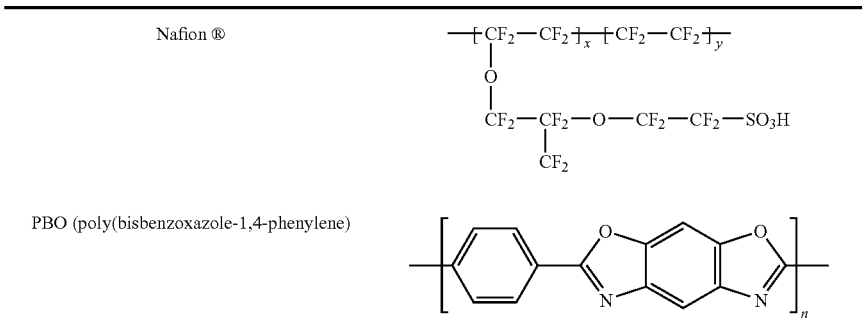

Nafion ®

PBO (poly(bisbenzoxazole-1,4-phenylene))

TABLE 1-continued

| | |
|---|---|
| PBT (poly(benzo(bis-thiazole)-1,4-phenylene)) | structure |
| PBI (poly(benzo(bis-diazole)-1,4-phenylene) | structure |
| PAR (polyaramid or Kevlar ®) | structure |
| PPSO$_2$ (polyphenylene sulfone) | structure |

TABLE 2

| | |
|---|---|
| PSU (polysulfone) (Udel ®) | structure |
| PES (polyether sulfone) | structure |
| PEES (polyether-ether sulfone) | structure |
| PAS (polyarylether sulfone) or PPSU (polyphenyl sulfone) | structure |

TABLE 3

| | |
|---|---|
| PI (polyimide) or poly(pyromellitic dianhydride/para phenylene diamine) | structure |
| PPO (poly(2,6 dimethyl 1,4 phenylene oxide)) | structure |

TABLE 3-continued
| | |
|---|---|
| PPSO (polyphenylene sulfoxide) | 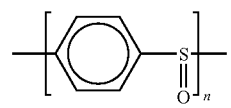 |
| PPS (polyphenylene sulfide) | 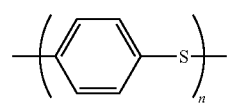 |
| PPS/SO$_2$ (polyphenylenesulfide sulfone) | 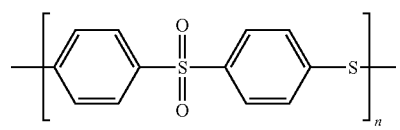 |
| PPP (polyparaphenylene) | 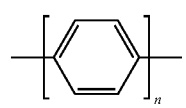 |
| PPQ (poly(phenylquinoxaline)) | 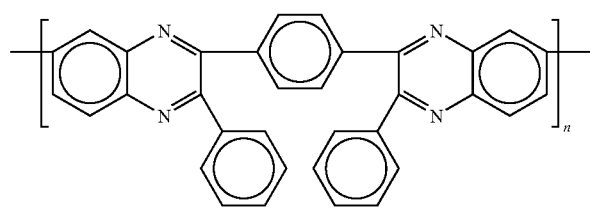 |
| PEK (polyetherketone) | 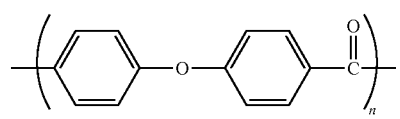 |
| PEEK (polyetheretherketone) | 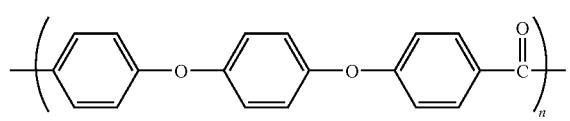 |
| PEKK (polyetherketoneketone) | 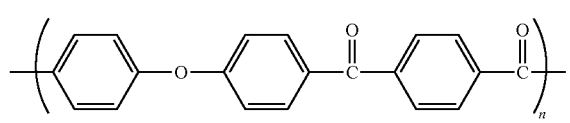 |
| PEEKK (polyetheretherketone-ketone) | 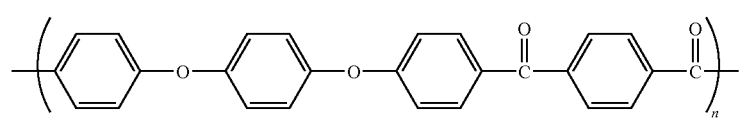 |
| PEKEKK (polyetherketone-etherketone-ketone) | 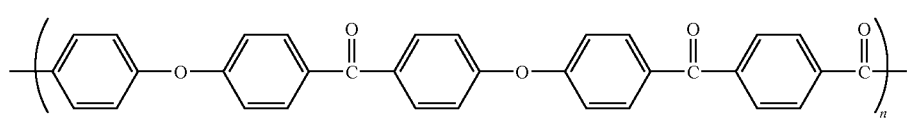 |

TABLE 4
| | |
|---|---|
| PEI (polyetherimide)<br>R = aryl, alkyl, aryl ether or alkylether | 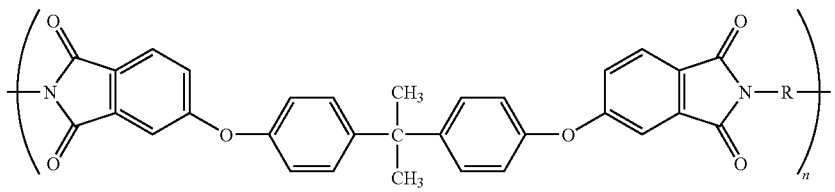 |
| Polysulfone (Udel ®) | 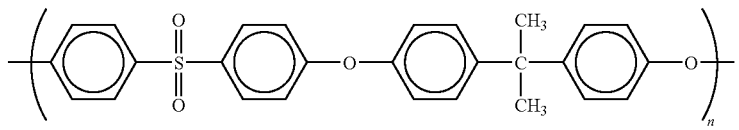 |
| Polyphenylsulfone (Radel R ®) | 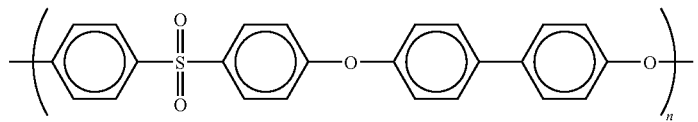 |
| Polyethersulfone (Radel A ®) | 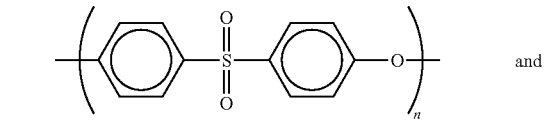 and |
| | 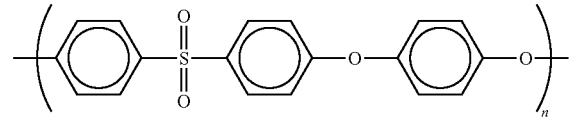 |
| Polyether sulfone (Ultrason E ®) | 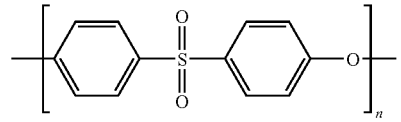 |
| Poly(hexafluoroisopropylidine dianhydride/meta phenylene diamine) | 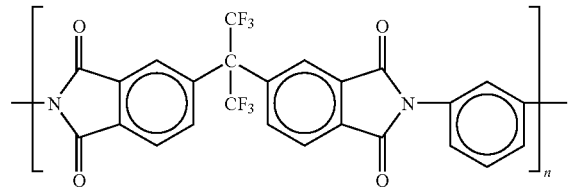 |
| Poly(triphenylphosphine oxide sulfide-phenylsulfone-sulfide) | 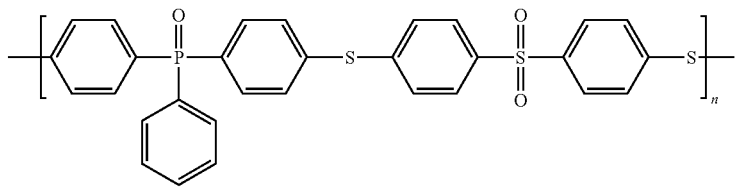 |
| Poly(2-phenylsulfide-1,4-phenylene) | 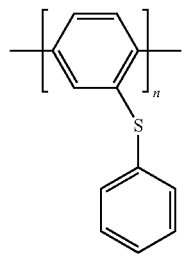 |

TABLE 4-continued
Poly(hexafluoroisopropylidene dianhydride/diaminodiphenyl sulfone)
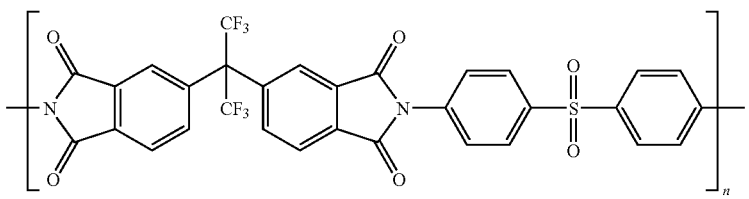
(PVSA) polyvinyl sulfonic acid
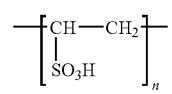
Poly(hexafluoroisopropylidene dianhydride/diaminodiphenoxybenzene)
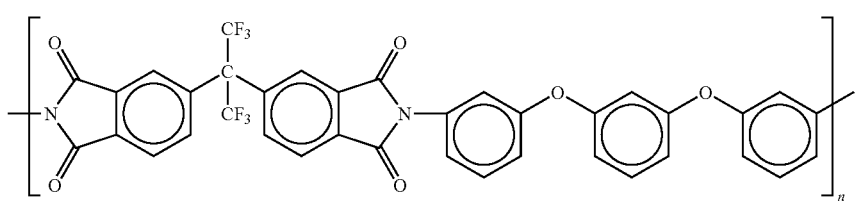
Poly-X ® (Maxdem)
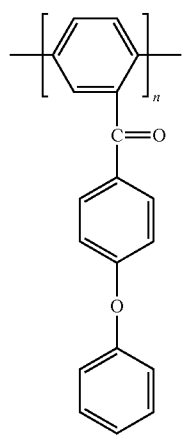
Poly(pyrolmellitic diimide-1,3-phenylene)
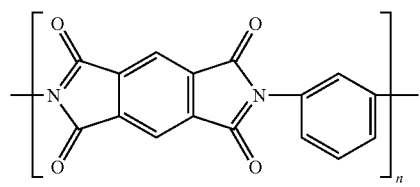
Poly(diphthalimide-1,3-phenylene)
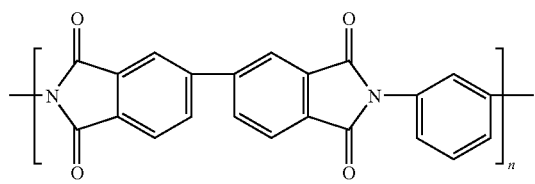
(PPO) poly(1,4-phenylene oxide)
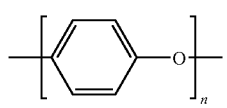

TABLE 4-continued

| | |
|---|---|
| Diphenyl PPO (poly(2,6-diphenyl-1,4-phenylene oxide)) | 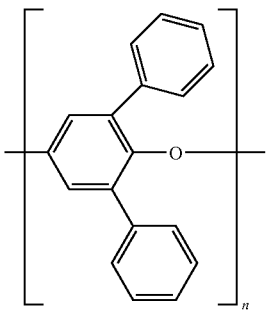 |
| PBPS (poly(benzophenone sulfide)) | 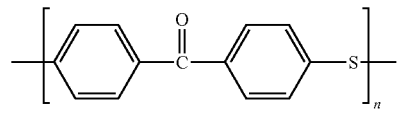 |
| Poly(benzophenone sulfide-phenylsulfone-sulfide) | 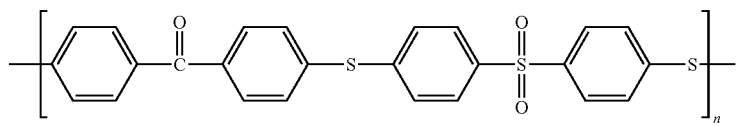 |
| Poly(acrylic acid) | 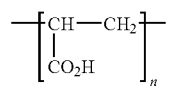 |
| Poly(trifluorostyrene sulfonic acid) | 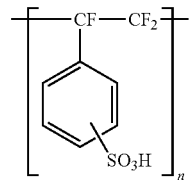 |
| Poly(vinyl phosphonic acid) | 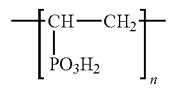 |
| Poly(styrene sulfonic acid) (PSSA) | 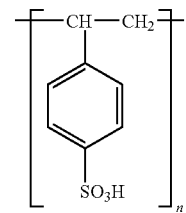 |

TABLE 5

| Serial Number | ICP Type (ID) | ICP (% wt) | Thickness (mils) Dry | Thickness (mils) Wet | % Dry Vol ICP (Estimated) | IEC (meq./g) | Water Content (%) | Resistance (ohm * $m^2$) | Peroxide Test | 1 M Me(OH) Permeability ($\times 10^{-6}$) Moles $CO_2$ per min per $cm^2$ per mil | Dim. Stability (% Area Change) |
|---|---|---|---|---|---|---|---|---|---|---|---|
| Nafion 117 Control | Nafion 117 (1100 EW) | 100 | 7.1 | 8.7 | 100 | 0.90 | 38 | 0.203 | −3.2% | 1.74 | ~20% |
| FMI 539-22-1 | 75% SPSU (Udel) | ~30 | NT | 1.5 | 49 | 0.55 | 45 | 0.056 | NT | NT | NT |
| FMI 539-22-2 | 75% SPSU (Udel) | ~30 | NT | 1.5 | 49 | 0.96 | 55 | 0.043 | NT | NT | NT |

TABLE 5-continued

| Serial Number | ICP Type (ID) | ICP (% wt) | Thickness (mils) Dry | Thickness (mils) Wet | % Dry Vol ICP (Estimated) | IEC (meq./g) | Water Content (%) | Resistance (ohm * m$^2$) | Peroxide Test | 1 M Me(OH) Permeability (×10$^{-6}$) Moles CO$_2$ per min per cm$^2$ per mil | Dim. Stability (% Area Change) |
|---|---|---|---|---|---|---|---|---|---|---|---|
| FMI 539-22-3 | 100% SPSU (Udel) | ~30 | NT | 2.0 | 49 | NT | NT | NT | NT | 0.187 | NT |
| FMI 126-08E | 75% SPES (Ultrason E) | 12 | 2.0 | 3.1 | 29 | 0.23 | 27 | 127.0 | −38% | NT | NT |
| FMI 126-08F | 75% SPES (Ultrason E) | 8 | 1.6 | 1.8 | 19 | 0.07 | 30 | 2177.1 | −36% | NT | NT |
| FMI 126-16N | 1100 EW (DuPont) | 10 | 0.8 | 0.9 | 16 | 0.29 | 43 | 1290.8 | NT | NT | nil |
| FMI 126-16O | 1100 EW (DuPont) | 10 | 0.9 | 1.0 | 16 | 0.39 | 32 | 1183.2 | NT | NT | nil |
| FMI 126-17P | 150% SPPSU (Radel R) | 20 | 1.1 | 3.5 | 40 | 0.82 | 87 | 5.11 | NT | NT | nil |
| FMI 126-17Q | 100% SPPSU (Radel R) | 20 | 1.2 | 2.5 | 40 | 0.62 | 60 | 16.60 | NT | 0.073 | nil |
| FMI 126-18T | 150% SPPSU (Radel R) | 20 | 2.1 | 4.7 | 40 | 0.54 | 90 | 1.85 | −63% | NT | nil |
| FMI 126-18U | 100% SPPSU (Radel R) | 20 | 3.1 | 3.7 | 40 | 0.50 | 92 | 16.34 | −56% | 0.179 | nil |
| FMI 126-AY1 | 200% SPPSU (Radel R) | 20 | 1.2 | 2.0 | 94 | 1.66 | 138 | 0.292 | NT | NT | nil |
| FMI 126-79BB | 1100 EW (Dupont) | ~17 | 2.0 | 2.5 | 40 | 1.16 | 47 | 0.637 | NT | NT | nil |
| FMI 126-82BE | 200% SPPSU (Radel R) | 20 | 1.0 | 1.5 | 94 | 0.91 | 143 | 0.140 | NT | 0.261 | nil |
| FMI 126-d91BO | 200% SPPSU (Radel R) | 8 | 1.1 | 2.0 | 79 | 1.13 | 64 | 0.263 | NT | NT | nil |

NT = NOT TESTED

EXAMPLES OF THE INVENTION

The polymers described herein are commercially available from a variety of suppliers (unless otherwise indicated). Suppliers of these polymers include the following: RTP, Ticona, Alpha Precision, Polymer Corp., Amoco Polymers, Greene Tweed, LNP, Victrex USA, GE Plastics, Norton Performance, BASF, Mitsui Toatsu, Shell, Ashley, Albis, Phillips Chemical, Sumitomo Bake, Sundyong, Ferro, Westlake, M. A. Hanna Eng.

The following procedures were employed in the fabrication and testing of samples that were prepared in accordance with the membranes and methods of this invention.

General Procedures
IEC Procedure

1. Cut out pieces of sulfonated films (target weight 0.2 g, target film thickness 2 mils).
2. Vacuum dry films at 60° C., record dry weights and note if films are in H+ or Na+ form.
3. Boil deionized water in separate beakers on hotplate.
4. Place films into boiling water.
5. Boil films vigorously for ½ hour.
6. Prepare 1.5N H$_2$SO$_4$.
7. Place films into H$_2$SO$_4$ and soak for ½ hour.
8. Remove films and rinse with deionized water.
9. Boil in deionized water again. Repeat until the films have soaked in H$_2$SO$_4$ three times.
10. Remove films from boiling water, pat film surface with paper towel, and rinse carefully with deionized water.
11. Place films in another beaker of water and check for pH.
12. Continue to rinse the films with water until pH is neutral to remove any excess acid trapped in the folds of the film.
13. Prepare saturated NaCl solution.
14. Boil the NaCl solution, pour into screw cap vials, add film and cap.
15. Place capped vials with film into water bath at 90° C. for 3 hours.
16. Remove capped beaker from water bath and cool to room temperature.
17. Remove the films from NaCl solution by pouring the salt solution into another beaker (save), wash the films with deionized water (save all washings—they will be used for titration).
18. Titrate the NaCl solution with 0.1N NaOH.
19. Take the films, pat with paper towel and take wet weight. (Use wet weight to determine water content of films.)
20. Dry the films under vacuum at 60° C. until constant weight.
21. Take dry weight and use this to calculate IEC.

Peroxide Test Procedure

22. Place films into the H+ form by following steps 1-12.

23. Make peroxide solution by adding 4 ppm Fe to 3% hydrogen peroxide (28.5 mg of ammonium iron (II) sulfate hexahydrate per liter of peroxide obtained from Aldrich).

24. Place the peroxide solution into water bath at 68° C.

25. Add films to the peroxide solution already at 68° C.

26. Peroxide test for 8 hours and record film properties (mechanical, color, handling etc.).

27. If film passes, remove from peroxide, rinse with water to remove all traces of peroxide solution.

Follow steps 13-21 to obtain post-peroxide test IEC.

Crosslinking Procedures

Ion-conducting polymeric samples can be crosslinked in the acid (H+) form to improve ICP stability. Normally, crosslinking is performed in vacuum, to exclude oxygen from the system (which can cause ICP charring). The vacuum oven should be preheated to temperatures of at least about 200° C. The ICP sample is then heated in the vacuum oven for a prolonged period of time. The ICP sample should be tested before and after crosslinking for IEC and peroxide stability in order to evaluate long term membrane stability. See e.g., Example 15 below.

Film Fabrication Procedures

Film Casting:

Unoriented, microporous substrate films can be made by dissolving the polymer in a suitable water miscible solvent and casting onto a glass plate or other surface. For example, dry PBO polymer can be dissolved in methanesulfonic acid (MSA). The films are slowly placed into a water bath, where solvent is rinsed from the films forming microporous, water-swollen membranes of PBO polymer. Subsequent washing allows for removal of all traces of the solvent.

Extrusion:

In general, the extrusion of a polymer solution (in a water miscible solvent) followed by its coagulation and washing in a water bath allows the formation of microporous polymer films. The mechanical properties and porosity are controlled by the characteristics of the polymer solution and the details of the extrusion process.

Microporous, biaxially-oriented films of liquid crystal polymers (LCPs) can be produced using a counter-rotating die (CRD) extrusion process. Solutions of the polymer are extruded using two annular and concentric mandrels that rotate in opposite directions. The rotation of the mandrels creates a transverse shear flow that is superimposed on the axial shear developed as the polymer solution is extruded through the die. The angle that the LCP fibrils make with the longitudinal axis of the tubular extrudate is $\pm\theta$, where $\theta$ can be varied from near-zero to about 65 degrees. The die rotation presets the biaxial ($\pm\theta$) orientation of the emerging extrudate.

Subsequent post-die blowout (radial expansion) and draw (extrusion direction stretching) are used to further adjust and enhance the biaxial orientation.

The tubular extrudate leaving the die is expanded radially (blown) with pressurized nitrogen and stretched in the machine direction by pinch rolls to achieve the desired film thickness. The blown and drawn PBO bubble is immediately quenched in a water bath where the film structure is coagulated, or "locked-in-place", and the polyphosphoric acid is hydrolyzed into phosphoric acid. The PBO film is collected under water on a spool, which is later transferred to a fresh water storage tank where it is thoroughly rinsed and stored in the water-swollen state until needed.

See e.g., U.S. Pat. No. 4,963,428.

Hot Pressing of LCP Membranes

A slug of LCP dope of a mass sufficient to yield a film of desired thickness and diameter is placed between a sheet of Mylar and a sheet of Teflon, with shims of desired thickness on the perimeter. This assembly is made within a hinged clam mold resting inside a vacuum press. Once evacuated, the sample is pressed to 20,000 lbs. at up to 105-100° C. and held at these conditions for 10 minutes. Pressure is then maintained while the press and sample are cooled to room temperature at a 25 degree per minute rate. The sample is removed from the press, and the Teflon is peeled off before mounting the sample in tensioning rings and immersing it in water to coagulate it.

Solvent Exchange:

The water swollen microporous substrate is used to complete a staged "solvent" exchange. The initial solvent (100% water) is exchanged for the desired solvent (e.g. NMP, alcohol, etc.) in a number of stages. To minimize the collapse of the pores, the exposure of the substrate film to the air is minimized. For example, note the 5 part exchange from water to NMP as follows:

|  | START | FINISH |
|---|---|---|
| Exchange #1: | 100% Water | 75% Water/25% NMP |
| Exchange #2: | 75% Water/25% NMP | 50% Water/50% NMP |
| Exchange #3: | 50% Water/50% NMP | 25% Water/75% NNP |
| Exchange #4: | 20% Water/80% NMP | 100% NMP |
| Exchange #5: | 100% NMP | Fresh (anhydrous) NMP |

Microporous substrate films are stored in the exchanged solvent until they are used in composite SPEM formation.

Sulfonation Procedures

Sulfonation Procedure I:

Aromatic PES polymers can be sulfonated to controlled degrees of substitution with sulfonating agents. The degree of substitution is controlled by the choice of and mole ratio of sulfonating agent to aromatic rings of the polymer, by the reaction temperature and by the time of the reaction. This procedure offers a method for carrying out sulfonation in a heterogeneous manner, i.e., sulfonation of precipitated polymer crystals.

The polymer (preferably a polyethersulfone) is first dissolved in the appropriate solvent (preferably methylene chloride) and then allowed to precipitate into a fine crystalline suspension. Sulfonation is carried out by simple admixture of the suspension with a sulfonating agent. Suitable agents include chorosulfonic acid and, preferably, sulfur trioxide (Allied chemicals stabilized Sulfan B® in $CH_2Cl_2$). The sulfonating agent used should be in sufficient proportion to introduce a number of sulfonate groups onto the polymer that is within the range of between 0.4:1 to 5:1 per polymer repeat unit, although this is not critical. The temperature at which sulfonation takes place is critical to limiting the side reactions but varies with the type of polymer (a preferable temperature is within the range of from −50° to 80° C., preferably −10° to +25° C.).

When the desired degree of sulfonation has been reached, the sulfonated polymer may be separated from the reaction mixture by conventional techniques such as by filtration, washing and drying.

The polymer products of the process of the invention may be neutralized with the addition of a base, such as sodium bicarbonate, when desired and converted to the alkali salts thereof. The alkali salts of the polymer products of the invention may be used for the same purposes as the parent acid polymers.

See e.g., U.S. Pat. No. 4,413,106.

Sulfonation Procedure II:

Concentrated sulfuric acid is used as the solvent in this procedure. The content of the sulfonating agent, sulfur trioxide, is based on the total amount of pure (100% anhydrous) sulfuric acid present in the reaction mixture, and is kept to a value of less than 6% by weight throughout the entire sulfonation. The sulfur trioxide may be mixed in dissolved form (oleum, fuming sulfuric acid) with concentrated sulfuric acid. The concentration of the starting sulfuric acid and oleum were determined by measuring their density immediately before use in the reactions.

The temperature of the reaction mixture is kept at less than +30° C. throughout the reaction. The sulfonation procedure is stopped by pouring the reaction mixture into water.

More specifically, the polymer is first dried in high vacuum at room temperature to constant weight, then dissolved in concentrated sulfuric acid. Oleum is then added drop-wise over a period of hours with constant cooling below +30° C., and with stirring. When all of the oleum has been added, the reaction mixture is stirred for a further period of hours at the same temperature. The resultant viscous solution is then run into water and the precipitated polymer is filtered off. The polymer is then washed with water until the washings no longer are acidic, and it is then dried.

If these conditions are maintained, a controllable sulfonation of aromatic polyether sulfones is possible and polymer degradation can be substantially or completely prevented.

Though less preferred, another variation of this procedure is to add the sulfur trioxide either in pure solid state or in gaseous state to a solution of the polymer in concentrated sulfuric acid.

See e.g., U.S. Pat. No. 5,013,765.

Sulfonation Procedure III:

This sulfonation procedure is directly analogous to procedure I, however, the polymer remains in solution at least until the addition of the sulfonating agent.

Polymer is first dissolved in a solvent that is compatible with the sulfonating agent (e.g. methylene chloride) in a nitrogen atmosphere. The sulfonating agent is added to this solution over the course of several hours. The resulting solution or suspension (if the polymer precipitates as the reaction occurs) is allowed to react, again for several hours.

When the desired degree of sulfonation has been reached, the sulfonated polymer may be separated from the reaction mixture by conventional techniques such as by filtration, washing and drying. If the sulfonated polymer remains in solution, the solvent can be removed simply by evaporation or precipitation into a non-solvent.

Membrane Preparation

Microporous substrate films previously exchanged into the appropriate solvent are placed consecutively into solutions of the various ion-conducting polymers (ICP) with increasing concentration (in the same solvent as the unfilled microporous substrate). This technique is known in the art (see, e.g., U.S. Pat. No. 5,501,831). Generally the use of smaller changes in ICP concentration seems to allow the formation of composite films with higher final ICP loadings. In the case of more viscous polymer solutions, the microporous substrates and the imbibing solution are heated (up to 100° C.). Once imbibed with the ICP, the composite film is placed between 6" diameter tension rings. As the rings are bolted together, the composite is carefully stretched to eliminate any veins or defects in the substrate. Once the rings are completely bolted together, the setup is left to air dry (e.g. in the hood) overnight. This will usually remove much of the excess ion-conducting polymer's solvent by evaporation.

The films are further dried by one of two methods. For low boiling solvents the composite films are heated under vacuum with pressure (about 100 psi) to prevent blistering of the films. In these instances porous, Teflon® coated shims are used to allow the solvent vapor to escape. Higher boiling composite films are simply heated under vacuum past the boiling point of the solvent. The overall uniformity of the final composite membrane can be improved by further pressing these composites at elevated temperature and pressure.

Composite Membrane Testing Methods

IEC. % Water Content, Membrane Degradation:

During this procedure, films are immersed in distilled $H_2O$ and boiled for a period of 30 minutes. The films are then placed in a solution of 1.5N $H_2SO_4$ at room temperature and soaked for a period of 30 minutes. This is repeated three separate times to ensure proper H+ ion exchange into the membrane. Films are rinsed free of acid (pH of rinse water >5.0) and placed into separate beakers, each filled with a saturated solution of NaCl. The salt solution is boiled for a period of three hours. The films, which are now in the Na+ form, are removed from the salt solution, rinsed with distilled water and padded to remove excess water. Now a wet weight and thickness of the sample are measured. While in the Na+ form, the films are dried in an air oven at a temperature of 60° C. The dry weight and thickness of the films are measured and the percent water content is calculated. The salt solutions are titrated with 0.1N NaOH to a phenolphthalein endpoint and IEC dry (meq/g) values calculated.

Ionic Conductivity:

Transverse ionic conductivity measurements are performed on film samples in order to determine the specific resistance (ohm*cm$^2$). Prior to the ionic conductivity measurements, film samples are exchanged into the H+ form using the standard procedure discussed above. To measure the ionic conductivity, the film samples are placed in a die consisting of platinum-plated niobium plates. The sample size tested is 25 cm$^2$. Prior to assembling in the measuring device, platinum black electrodes are placed on each side of the film sample to form a membrane-electrode assembly (MEA). To insure complete contact during the resistivity measurement, the MEA is compressed at 100 to 500 psi. The resistance of each film is determined with a 1000 Hz, low current (1 to 5A) bridge, four point probe resistance measuring device and converted to conductivity by using formula 1.

$$C = t/R \times A \quad (1)$$

Where: C=Conductivity (S/cm)
R=Sample Resistance (ohm)
t=Wet sample thickness (cm)
A=Sample area (cm2)

Measurements are converted to specific resistance by calculating the ratio of thickness over conductivity (ohm*cm$^2$).

Membrane Degradation:

Accelerated degradation testing is carried out using 3% $H_2O_2$ solution with 4 ppm Fe++ added as an accelerator. The films are tested for a period of 8 hours at a temperature of 68° C. The percent degradation of IEC was measured in the film samples after the test. After 8 hours, the films are removed from solution, and re-exchanged using 1.5 N $H_2SO_4$. The IEC is recalculated, and the test result expressed as the % loss in IEC. This test simulates long term (several thousand hours) of actual fuel cell operation. For $H_2/O_2$, fuel cells, <10% IEC degradation in this test would be considered acceptable.

Example 1

Sulfonation of Radel R®

Using Sulfan B® (100% and 150% Stoichiometric Sulfonation)

Sulfonation Procedure I was used in the following example.

Two separate 1000 ml 3 neck resin kettles (with ribs) equipped with an $N_2$ inlet, addition funnel, and overhead stirrer were charged with the following reactants: 340 ml of dichloromethane and 50.00 grams of Radel R® Polyphenylsulfone Polymer (beads). These mixtures were stirred until solutions formed (approximately 0.25 hours). Once solutions formed, they were cooled in ice baths to about a temperature of 0° C. (ice bath was maintained throughout the duration of the addition and reaction). (Note that Radel R® was dried at 70° C. under full dynamic vacuum for about 12 hours to remove any adsorbed moisture.)

While the above solutions were cooling, the following amounts of Sulfan B® were combined with dichloromethane in two separate 125 ml addition funnels. In funnel #1 (100% sulfonation) 10.00 grams of Sulfan B® was combined with 120 ml of dichloromethane. In funnel #2 (150% sulfonation) 15.00 grams of Sulfan B® was combined with 120 ml of dichloromethane.

As polymer solutions were cooled, the polymer precipitated from solution to form a viscous paste. To each of these polymers approximately 350 ml of dichloromethane was added to aid in the uniform mixing of the suspensions. The diluted suspensions were then cooled to ice bath temperatures once again.

To the rapidly stirring cooled and diluted polymer suspension, the Sulfan B® solutions were added drop-wise over a period of 3.5 to 4.0 hours.

Upon completing the addition of the Sulfan B®/dichloromethane solution, the reaction mixtures were permitted to stir at ice bath temperatures for another 2.5 hours, then the reaction was stopped by adding approximately 10 ml of deionized water to each of the reaction mixtures.

The reaction mixtures (white dispersions) were recovered by filtration using a glass frit. Products (white powder) were washed 3× with 100 ml portions of dichloromethane. The washed products were then permitted to air dry in the hood. 20% solutions of the dried products were made in NMP and cast on soda lime glass plates. The freshly cast films were left to stand in a dry box with a relative humidity of less than 5% for a period of 24 hours. The cast films were heated at 70° C. under full dynamic vacuum for an hour prior to floating the films off with deionized water. The floated films were then permitted to air dry overnight.

The 100% and 150% sulfonated products swell greatly in water and become opaque, but when films are dry they shrink and become clear once again. The mechanical strength of these films allows creasing while resisting tearing. Films of the 100% and 150% products are not soluble in boiling water, and under these conditions also maintain their mechanical properties.

IEC: 100% sulfonated Radel R® unpurified=1.39 meq./g

150% sulfonated Radel R® unpurified=1.58 meq./g

These polymers were further purified by dissolving in NMP (at 20 wt. %) and then precipitated into a large excess of saturated salt water. The resulting polymers were soaked in sodium bicarbonate, washed several times with water, then dried under vacuum (~100° C.). These polymers were also cast into films as described above for characterization.

IEC: 100% sulfonated Radel R® purified=1.26 meq./g

150% sulfonated Radel R® purified=1.44 meq./g

Water Pick-up (wt. %):

100% sulfonated Radel R® purified=56%

150% sulfonated Radel R® purified=110%

Example 2

Sulfonation of Radel R®
Using Sulfan B® at 200% Stoichiometric Sulfonation
Procedure:

This sulfonation reaction was run very similarly to those previously described in Example 1 (100, 150% sulfonations with Sulfan B®), with minor adjustments, which are noted below:

After the precipitation of the polymer from the initial dichloromethane solutions, only 200 ml of new solvent was added to enhance stirring (in Example 1, an additional 350 ml was used).

Previous data suggests that not all of the $SO_3$ reacts with the polymer over 6 hours at 0-5° C. Therefore, one reaction was carried out at ice bath temperatures for 8 (or more) hours and then allowed to warm to room temperature. Although the resulting sulfonated Radel R® was darker in color than the batch that was quenched after only 6 hours, the polymer was still water insoluble and showed good film properties. The properties of such ICPs are:

200% Sulfonated Radel R (quenched after 6 hrs at 0-5° C.):
IEC=1.67 meq/g, Water Pick-up=144%, Conductivity=0.073 S/cm.

200% Sulfonated Radel R (quenched after allowed to warm up):
IEC=1.90 meq/g, Water Pick-up=174%, Conductivity=0.091 S/cm A similar reaction was carried out in which the $SO_3$ was allowed to react longer, but was kept cold (0-5° C.) throughout the reaction. The product isolated from this reaction had an IEC value (1.71 meg/g) which was between the two batches described above.

Note: Percent sulfonation in terms of stoichiometry, e.g., 200% sulfonation, refers to the use of a particular excess per each polymeric repeat unit, e.g., two moles in the case of 200% sulfonation.

Example 3

Sulfonation of BASF Ultrason® Polyether Sulfone
Using Sulfan B®
(85%, 75%, and 65% Sulfonation)

Sulfonation Procedure III was used in the following example.

Three separate 1000 ml 3 neck resin kettle (with ribs) equipped with an $N_2$ inlet, addition funnel, and overhead stirrer were charged with the following reactants: the first resin kettle was charged with 350 ml of dichloromethane and 51.00 grams of BASF Ultrason polyether sulfone polymer (fine powder), the second was charged with double the amount of reactants, and the third was charged with the same ratios as the first. Ultrason was dried at 70° C. under dynamic vacuum for about 12 hours prior to use. These mixtures were stirred until solutions formed (approximately 15 min.). Once solutions formed, they were cooled in ice baths to about a temperature of 0° C. (ice bath was maintained throughout the duration of the addition and reaction).

While the above solutions were cooling, the following amounts of Sulfan B® were combined with dichloromethane in three separate 125 ml addition funnels. In funnel #1 (85% sulfonation) 14.94 grams of Sulfan B® were combined with 120 ml of dichloromethane. In addition funnel #2 (75% sulfonation) 26.32 grams of Sulfan B® were combined with 120 ml of dichloromethane. In addition funnel #3 (65% sulfonation) 11.80 grams of Sulfan B® were combined with 120 ml of dichloromethane. These solutions were then added dropwise to the corresponding rapidly stirring cooled polymer solutions over a period of 4 hours.

Addition of the Sulfan B® solution caused the polymer to precipitate and form a very viscous sludge. These were diluted with the following amounts of anhydrous dichloromethane. Reaction #1 was diluted with 70 ml of anhydrous dichloromethane, #2 was diluted with 600 ml of dichloromethane, and #3 was diluted with 400 ml of dichloromethane. Upon completing the addition of the Sulfan B®/dichloromethane solution, the reaction mixture was permitted to stir and warm to room temperature overnight. The following morning the reaction mixtures (a white dispersion) were filtered using a glass frit. Products (a fine white powder) were washed 3× with 100 ml. portions of dichloromethane. The washed products were then permitted to air dry in the hood for 4 hours.

20 wt. % solutions of the dried products were made in NMP. The polymer solutions were filtered using a 2.5 micron glass fiber filter cartridge. The filtered products were then precipitated into approximately 4 liters of water. These products were then washed 2× with deionized water. The washed products were converted into the sodium form by soaking in a 2.5% sodium hydroxide solution over several days. These were then washed with deionized water until a neutral pH was achieved. Finally, the samples were thoroughly dried in vacuum.

When 85% sulfonated polymer is boiled in water, it swells greatly and partially dissolves. The 75% and 65% sulfonated products do not dissolve in boiling water, however they showed considerable swelling.

IEC: 65% sulfonated Ultrason purified=0.69 meq./g
75% sulfonated Ultrason purified=0.80 meq./g
85% sulfonated Ultrason purified=1.08 meq./g
Water Pick-Up (wt. %):
65% sulfonated Ultrason purified=18%
75% sulfonated Ultrason purified=21%

Example 4

Synthesis of Sulfonated Udel® Polyether Sulfone
Using Chlorosulfonic Acid (33-100% sulfonation)

Sulfonation Procedure III was used in the following example.

Procedure:

A 1000 ml. 3 neck round bottom flask equipped with a condenser, $N_2$ inlet, and overhead stirrer; was charged with 175 ml of dichloromethane and 50.0 grams of Udel® Polyethersulfone. This mixture was stirred until a solution formed (approximately 3 hours).

While the above was stirring 11.49 grams of chlorosulfonic acid was mixed with 50 ml. of dichloromethane in a 125 ml. addition funnel. This solution was added dropwise to the rapidly stirring polymer solution over a period of an hour. The reaction mixture changed from a clear amber color to a cloudy caramel color. Upon completing the addition the acid solution, the reaction mixture was permitted to stir at room temperature over night.

After stirring at room temperature for 28 hours the reaction mixture was heated in a water bath until a mild reflux was achieved, and it was kept refluxing under these conditions for an hour. After heating the reaction mixture for an hour the heat source was removed and the mixture was permitted to cool.

After removal of the solvent, the product was dissolved in THF. Films cast from this solution were transparent and creasible. IR spectra and water absorption were consistent with the formation of sulfonated Udel® Polyethersulfone.

Complete reaction of the chlorosulfonic acid corresponds to the addition of 0.85 sulfonate groups per repeat unit of the polymer (85%). Similarly, sulfonated versions of Udel® Polyethersulfone were made with levels of sulfonation from 33 to 100%.

IEC: 75% sulfonated Udel=1.10 meq./g
85% sulfonated Udel=1.19 meq./g
Water Pick-up (wt. %):
75% sulfonated Udel=12%
85% sulfonated Udel=93%

Example 5

Synthesis of Sulfonated-Polyimides
(via Monomers)

Sulfonation procedures described by Sillion [French patent 9,605,707] were used as a guide in the following example. However, alternate monomers and reaction conditions were employed.

Sulfonated polyimides are produced by the reaction of a sulfonated diamine with a dianhydride, using a 1.000 molar ratio of diamine/dianhydride, in a solvent under an inert atmosphere. An exact diamine/dianhydride molar ratio of 1.000 is required in order to achieve high molecular weight polymers. Polyimides are synthesized through an intermediate polyamic acid form which contains an amide linkage and carboxylic acid groups. This polyamic acid may or may not be isolated from the reaction solution. The polyamic acid is converted to the corresponding polyimide by a cyclization reaction involving the amide hydrogen and neighboring carboxylic acid groups, forming a five (or six) membered imide ring, with the evolution of water as a reaction byproduct.

Polyimides can be made via two general procedures: 1) first synthesize, at or below ambient temperatures its solvent-soluble polyamic acid form, then chemically or thermally transform this polyamic acid to the polyimide; and 2) directly synthesize the solvent-soluble polyimide using reaction temperatures in excess of 100° C. to distill water from the initial reaction solution. Each of these procedures was used at Foster-Miller to produce sulfonated-polyimides. The details of these reactions are presented below.

Formation of the Sodium Salt of
2,4-Diaminobezenesulfonic Acid (2,4-NaDBS)

2,4-Diaminobenzenesulfonic acid (2,4-DBS) (5.00 grams, 26.6 mmoles) was dispersed in 95.29 grams anhydrous methanol at ambient temperatures under a positive nitrogen atmosphere in a reaction flask equipped with a reflux condenser, magnetic spinbar for stirring purposes and pressure equalizing funnel. A cloudy dispersion of sodium hydroxide (1.06 grams, 26.6 mmoles) in methanol (93.4 grams) at a concentration of 1.1 wt. percent was placed in the pressure equalizing funnel and added dropwise to the stirring 2,4-DBS/methanol dispersion at ambient temperatures. Additional methanol (195 grams) was added to transform the dispersion into a brownish orange colored solution after stirring overnight, containing approximately 1.3 wt. percent solids. Initially, 2,4-DBS was found to be insoluble at similar concentrations in methanol, indicating 2,4-DBS has been converted into a more soluble material. The solution was heated at reflux for several hours to ensure the reaction had gone to completion, cooled to ambient temperatures, and filtered to remove any trace amounts of undissolved material. Hexanes (275 mL) were then added to the solution to precipitate a tannish solid. This solid was collected by filtration, washed with hexanes and air dried. The material exhibited a single reproducible endothermic absorption between 246° to 252° C., with a peak width at half height of 5.3° C. by differential scanning calorimetry. Its infrared spectrum (IR) showed absorptions typical for a —$NH_2$ amine (3426, 3380, and 3333 $cm^{-1}$), a primary amine (3199 $cm^{-1}$), aromatic C-Hs (1624 $cm^{-1}$) and $SO_3$ salt (1230 and 1029 $cm^{-1}$) groups. These $SO_3$ salt absorptions were located at values different than those observed for $HOSO_2$ in 2,4-DBS, which appeared at 1302 and 1134 $cm^{-1}$. The amine absorption at 3426 $cm^{-1}$ in this material was also not present in 2,4-DBS. The IR absorption typical for a sulfonic acid (—$SO_2$—OH) group at 2609 $cm^{-1}$ in 2,4-DBS was also absent. The combination of all this information indicates the tannish solid product is sodium 2,4-diaminobenzenesulfonate (2,4-NaDBS).

This material was be used as an alternative to 2,4-DBS in the synthesis of sulfonated polyimides due to its increased thermal stability and potentially increased reactivity toward polyimide formation (amine groups in the 2,4-NaDBS are more reactive toward the dianhydride monomer due to electron release from the sulfonate group).

Synthesis of the Copolyamic Acid Derived from 6FDA, m-Phenylenediamine (m-PDA) and 2,4-NaDBS (6FDA/m-PDA/2,4-NaDBS PAA)

2,4-DBS (7.75 mmoles) and m-PDA (7.75 mmoles) were easily dissolved in anhydrous dimethylsulfoxide (DMSO) at ambient temperatures under a nitrogen atmosphere. 6FDA (15.5 mmoles) was added all at once to the diamine solution and the mixture was stirred at ambient temperatures under a nitrogen atmosphere. The reaction mixture became warm to the touch as the 6FDA began to dissolve and the resulting, solution was stirred overnight at ambient temperatures. This clear reddish brown solution contained 15.0 wt. percent polymer and exhibited a viscosity similar to warm syrup, indicating polymers with reasonable molecular weights had been produced. The IR spectrum of the reaction solution showed absorptions typical for —NH of an amide (3249 and 3203 $cm^{-1}$), C=0 amide I stretch (1683 $cm^{-1}$), aromatic C-Hs (1607 $cm^{-1}$), N—C=0 amide II symmetric stretch (1548 $cm^{-1}$) and $SO_3$ salt (1256 and 1020 $cm^{-1}$). The IR absorption for —OH of $HOSO_2$ at 2609 $cm^{-1}$ was absent from the spectrum. This IR data is consistent with the formation of the 6FDA/m-PDA/2,4-NaDBS copolyamic acid.

A sample of the polyamic acid solution was cast into a film on a NaCl salt IR disc and the film/disc was heated in a circulating air oven for 1 hour each at 100°, 200° and 300° C. to convert the copolyamic acid to its copolyimide form. The IR spectrum of copolyimide film showed absorptions typical for C=0 imide stretch (1787 and 1733 cm–1), aromatic C—H (1603 $cm^{-1}$), C—N imide stretch (1362 $cm^{-1}$), $HOSO_2$ acid (1298 and 1145 $cm^{-1}$), $SO_3$ salt (1256 and 1029 $cm^{-1}$) and polyimide (745 and 721 $cm^{-1}$). IR absorptions typical for polyamic acids at 1683 and 1545 $cm^{-1}$ as well as the —OH of $HOSO_2$ at 2609 $cm^{-1}$ were absent. Nevertheless, it appears that some of the $NaSO_3$ groups were converted to $HOSO_2$ by free acid generated during the continuing polymerization.

Thermal Imidization of 6FDA/m-PDA/2,4-NaDBS PAA.

A sample of the reaction solution was cast into a large film with an initial thickness of 0.007 inch on a glass substrate using a motorized film casting table located inside a low humidity chamber (<10 percent relative humidity). The resulting clear copolyamic acid film was heated in a circulating air oven for 1 hour each at 100°, 200°, and 250° C. to form a reddish brown copolyimide film. A final temperature of 250° rather than 300° C. was used to hopefully reduce the thermal degradation of the resulting $NaSO_3$ groups, believed to occur at temperatures >200° C. The copolyimide film broke into many very small pieces upon removal from the glass substrate, a sign that the molecular weight of the copolyimide may be quite low.

Synthesis of the Copolyimide Directly from 6FDA, m-PDA, and 2,4-NaDBS (6FDAlm PDA12,4-NaDBS PI) A brownish dispersion of 2,4-NaDBS (7.47 mmoles) and m-PDA (8.01 mmoles) in m-cresol (50 grams) and anhydrous toluene (20 grams) in a 3-necked flask equipped with a thermometer, mechanical stirrer, and Dean Stark trap fitted with a condenser/nitrogen inlet was heated at about 150° C. under a nitrogen atmosphere. 6FDA (15.49 mmoles) was added to the hot dispersion, whereupon water immediately began to distill out of the reaction dispersion and become collected in the trap. The temperature of the brownish dispersion was gradually increased to about 200° C., maintained at 200° C. for 7.5 hours, and then decreased to ambient temperatures. The resulting dark brown colored, viscous reaction mixture was found to be a dispersion containing significant quantities of crystalline material(s). The IR spectrum of the reaction dispersion showed absorptions typical for or C=0 imide stretch (1781 and 1723 $cm^{-1}$), C—N imide stretch (1365 $cm^{-1}$), $SO_3$ salt (1251 and 1033 $cm^{-1}$), and polyimide (738 and 720 $cm^{-1}$). The presence of m-cresol in the film prevents determination of whether $HOSO_2$ groups are present due to overlapping absorptions. IR absorptions typical for polyamic acids at 1683 and 1548 $cm^{-1}$ as well as the OH stretch of $HOSO_2$ were absent. IR data indicated some sodium sulfonate-copolyimide had been produced under the reaction conditions, but the presence of a crystalline dispersion rather than solution suggests a significant amount of the diamine was not incorporated into a polymer.

The consistent problem encountered during these reactions was low molecular weight of the final product. The above syntheses did not provide a creasable, sulfonated polymer film. However, fragments of the polymer are unchanged by the peroxide test and have IECs up to 1.13 meq./g.

It is anticipated that higher molecular weight polymer will be obtained by further purifying the 2,4-NaDBS monomer prior to polymerization. In addition, the use of isoquinoline as a polymerization catalyst may accelerate the reaction.

Example 6

Sulfonation of Victrex® Poly(Ether Ketone)
Using $H_2SO_4/SO_3$
Sulfonation Procedure II was used in the following example.
Procedure:
30.00 g PEK polymer (Victrex®) was dissolved in 270 g of concentrated sulfuric acid (93.5 wt. %) under nitrogen, stirred by an overhead mechanical stirrer. The polymer was dispersed over several days to form a dark red thick solution.

176 g of this solution was left in the three neck flask with overhead stirrer, $N_2$, etc. To the flask, 208.4 g of fuming sulfuric acid (25.5 wt. % free $SO_3$) was added over the coarse of a few minutes with constant stirring to raise the solution to a free $SO_3$ content of 2 wt. %. The resulting solution was immersed in a room temperature water bath to control the temperature.

Samples were removed after approx. 1 hour, 3 hours, and 16 hours, and quenched into deionized water to precipitate.

In order to make films, the 1 and 3 hour products were washed several times with deionized water, soaked overnight in approximately 0.5M NaOH solution, then washed until a neutral pH was achieved. These were blotted dry and placed in the vacuum oven overnight at 50° C. Dried samples were dissolved in NMP to make a 20 wt. % solution. This required heating overnight at 60° C. Films of approx. 6 mils were cast onto a freshly cleaned glass plate. After two days of drying the films were removed by immersion into deionized water.

Soaking the films in water (at room temperature) caused considerable swelling to give a hazy gel-like consistency, but the 1 hour and 3 hour samples did not dissolve. Film of the 1 hour product could be hydrated and dehydrated, while maintaining resistance to tearing. The 1 hour sulfonated PEK film IEC was measured to be 2.3 meq/g.

Example 7

Sulfonation of PPS/SO$_2$ Using 97.5% H$_2$SO$_4$
Sulfonation Procedure II was used in the following example.
PPS/SO$_2$ provided by James McGrath of VPI [see Synthesis and Characterization of Poly(Phenylene sulfide—sulfone). *Polymer Preprints* 38 (1), 1997, p.109-112].
Procedure:
250 ml 3 neck round bottom flask was equipped with an overhead stirrer, N$_2$ inlet, and addition funnel were charged with 100 grams of 93.5% sulfuric acid. To the rapidly stirring sulfuric acid 25.00 grams of the PPS/SO$_2$ was added. The mixture was stirred at room temperature until a solution formed (approximately 1 hour).

When solution had formed the temperature was lowered to about 0° C., and 60.0 grams of 23.0% fuming sulfuric acid was added dropwise over a period of a 0.5 hours.

Ice bath temperatures were maintained for the first 3.5 hours of the reaction. Aliquots were taken at T=0.5, 1.5, 2.0, and 3.0 hours by precipitation the reaction mixtures were precipitated into deionized water. Precipitated product appeared not to have swollen to any appreciable extent, so the remaining reaction mixture was warmed to room temperature. Aliquots were taken at t=3:30, 4:30, 7:00, and 8:20 (approximately 4 hours at room temperature).

Products were rinsed 3 times with deionized water, soaked in saturated sodium bicarbonate solution until basic and then washed in deionized water until neutral.

Solubilizing of the sulfonated PPS/SO$_2$ polymers was attempted after drying the precipitated polymer at 100° C. for 3 hours under full dynamic vacuum. The polymer solutions were made with fresh anhydrous NMP and were immediately cast on soda lime glass plates at a thickness of 2 mils. The freshly cast films were placed in a level oven preheated to 100° C. and dried under full dynamic vacuum for 1 hour. After drying (at 100° C.) for an hour, the oven temperature was raised gradually to 200° C. over a period of 3 hours. When the 200° C. was achieved, the oven was shut off and the films were permitted to gradually cool to room temperature. Films were removed from the glass plates by floating them in deionized water.

Based on crude observations of the PPS/SO$_2$ films, this material appears not to have sulfonated to any appreciable extent while kept at 0° C. (little dimensional changes were observed when boiled in water). The PPS/SO$_2$ samples that were reacted at room temperature appear to show some signs of sulfonation (swelling and taking on a rubbery appearance in boiling water).

IEC sulfonated PPS/SO$_2$:
T=8:20, 0.53 meq./g
Water Pick-up (wt. %) sulfonated PPS/SO$_2$:
T=8:20, 15%

Increased IECs of the sulfonated PPS/SO$_2$ samples should be possible with increased reaction times.

Example 8

Sulfonation of Poly(phenylquinoxaline)
PPQ was prepared as described in the literature (See e.g., *Macromolecular Syntheses*, 1974, vol. 5 p. 17), by dissolving equimolar amounts of an aromatic bisbenzildiketone and a bis-o-diamine in a 1:1 mixture of m-cresol and xylene. The resulting polymer was isolated by dilution with chloroform followed by precipitation into a large excess of methanol. The polymer was thoroughly washed with methanol and vacuum dried.

Sulfonation was achieved by first dissolving this polymer in concentrated sulfuric acid, followed by the addition of enough fuming sulfuric acid to react with any water remaining in the system (i.e. 100% H$_2$SO$_4$). The resulting solution was heated to 125° C. with constant stirring. Aliquots were taken over 6 hrs. at this temperature. Each aliquot was isolated by precipitation into water, soaking in saturated sodium bicarbonate, followed by several rinsings with deionized water. Sulfonation of the later aliquots was inferred from their enhanced solubility in polar solvent systems. Generally, films cast of the sulfonated PPQ (sodium salt form) are tough, creaseable, and swell in water.

Alternatively, a PPQ film can be soaked in a 50% solution of H$_2$SO$_4$ for approx. 2 hour in order to fully sulfate it; then baked at a minimum temperature of 300° C. to convert the ammonium sulfate salt to the covalently bonded sulfonic acid. This procedure has been used for the sulfonation of PBI and PPQ films. See e.g., U.S. Pat. No. 4,634,530 and Linkous, et al., *J. Polym. Sci.*, Vol. 86: 1197-1199 (1998).

Example 9

Fabrication of SPEM
Using PBO and Sulfonated Radel R®
Ion-conducting membranes were fabricated from the polymer substrate film PBO and various sulfonated poly(phenyl sulfones). The substrate utilized was PBO film extruded and solvent exchanged into NMP as described above in the general procedure. The ion-conducting polymer (100, 150% sulfonated Radel R®—Na+ form) was synthesized according to Example 1 given above.

Microporous PBO, having been exchanged into NMP without collapse of the pores, was added to a 5 wt. % solution of the sulfonated Radel R® polymers in NMP. After twelve or more hours, the films were removed and placed in a 20 wt. % solution of the same ion-conducting polymer (also in NMP). After twelve or more hours at room temperature (or at 75° C.) the films were removed, stretched in tensioning rings, and dried of the solvent (see general procedure outlined above). Specifically, the sulfonated Radel R®/PBO films were dried in a low humidity chamber (<5% RH) for 1 to 2 days, vacuum dried in an oven heated from below 60° C. to about 200° C.

After all solvent is fully extracted from the membrane, the composite is preferably hot pressed. The hot pressing operation facilitates flow of the ion-conductor to make a homogenous composite structure. Non-porous Teflon® shims were placed on each side of the composite membrane followed by Titanium shims. The entire setup is then loaded into a press and subjected to the following cycle:

High Temperature Hot Press

| Step | Temp. | Hold Time | Force | Ramp Rate |
|---|---|---|---|---|
| 1 | 392° F. | 5 min | 1.0 klb | 15 F/min |
| 2 | 392° F. | 15 min | 28.3 klb | N/A |
| 3 | 85° F. | 5 min | 28.3 klb | 25 F/min |

Note that the 28.3 klbf corresponds to a press pressure of 1000 psi.

SPEMs produced via this example were FMI 126-17P, FMI 126-17Q, FMI 126-17T, FMI 126-17U. See Table 5 for various results obtained from SPEMs made via this procedure.

Example 10

Fabrication of SPEM
Using PBO and Sulfonated Udel®

Ion-conducting membranes fabricated in this example followed closely those in Example 9.

The substrate utilized was PBO film extruded and solvent exchanged into THF as described above in the general procedure. The ion-conducting polymer (75, 85, 100% sulfonated Udel®) was synthesized according to Example 4 given above.

For composite SPEMs of 100% sulfonated Udel® ion-conducting polymer, microporous PBO films exchanged into THF were placed into 30 wt. % solutions of the polymer (in THF) at room temperature. After more than twelve hours, the films were stretched in tensioning rings and allowed to dry in a low humidity chamber. Final traces of the solvent were removed with the following vacuum pressing shown below.

Low Temperature Vacuum Pressing

| Step | Temp. | Hold Time | Force | Ramp Rate |
|---|---|---|---|---|
| 1 | 122° F. | 20 min | 2.9 klb | 15 F/min |
| 2 | 167° F. | 20 min | 2.9 klb | 15 F/min |
| 3 | 212° F. | 20 min | 2.9 klb | 15 F/min |
| 4 | 257° F. | 20 min | 2.9 klb | 15 F/min |
| 5 | 85° F. | 5 min | 2.9 klb | 25 F/min |

The force of 2.9 klb corresponds to a press pressure of 100 psi. Films were finally hot pressed without vacuum to fully consolidate the composite structure, as shown below.

High Temperature Hot Press

| Step | Temp. | Hold Time | Force | Ramp Rate |
|---|---|---|---|---|
| 1 | 317° F. | 30 min | 28.3 klb | 15 F/min |
| 2 | 85° F. | — | 28.3 klb | 25 F/min |

The force of 28.3 klb corresponds to a press pressure of 1000 psi.

Composite SPEMs were made with both 75 and 85% sulfonated Udelo ion-conducting polymers.

SPEMs produced via this example were FMI 539-22-1, FMI 539-22-2, FMI 539-22-3. See Table 5 for various results obtained from SPEMs made via this procedure.

Example 11

Fabrication of SPEM
Using Solubilized Nafion® 1100 EW

Ion-conducting membranes fabricated in this example followed closely those in Example 9.

The substrate utilized was PBO extruded film and solvent exchanged into a mixture of water and alcohols (see below) as described above in the general procedure. The ion-conducting polymer used was solubilized Nafion® 1100 EW purchased from Solution Technologies (10 wt. % in a mixture of water and propanols). The solvent system used to exchange the PBO films was made to approximate that of the Nafion® solution.

Composite membranes were made by placing the exchanged films directly into the 10 wt. % Nafion® solutions. After twelve or more hours, these were removed and stretched into tensioning rings as described above. These films were dried in a low humidity chamber for at least 24 hours. Removal of the final traces of solvent were done by placing porous PTFE shims on each side of the composite membrane followed by the Titanium shims. This setup was then loaded into a vacuum press and subjected to the following cycle:

Low Temperature Vacuum Pressing

| Step | Temp. | Hold Time | Force | Ramp Rate |
|---|---|---|---|---|
| 1 | 125° F. | 20 min | 2.9 klb | 15 F/min |
| 2 | 170° F. | 20 min | 2.9 klb | 15 F/min |
| 3 | 215° F. | 20 min | 2.9 klb | 15 F/min |
| 4 | 274° F. | 20 min | 2.9 klb | 15 F/min |
| 5 | 85° F. | 5 min | 2.9 klb | 25 F/min |

The force of 2.9 klb corresponds to a press pressure of 100 psi. Films were finally hot pressed without vacuum to fully consolidate the composite structure, as shown below.

High Temperature Hot Press

| Step | Temp. | Hold Time | Force | Ramp Rate |
|---|---|---|---|---|
| 1 | 275° F. | 5 min | 1.0 klb | 15 F/min |
| 2 | 275° F. | 15 min | 28.3 klb | N/A |
| 3 | 85° F. | 5 min | 28.3 klb | 25 F/min |

The force of 28.3 klb corresponds to a press pressure of 1000 psi.

SPEMs produced via this example were FMI 126-16N, FMI 126-16O. See Table 5 for various results obtained from these SPEMs. The low IECs obtained from these films and the correspondingly high resistances are a function of the low loading of ion-conductor in the composite structure. It is anticipated that using more concentrated solutions of the ion-conductor in imbibing the substrate will lead to composite SPEMs of low enough resistances for the applications described. The stability of the lateral dimensions of these Nafion® based composite membranes presents a significant improvement over unsupported Nafion® 117 films (which show in plane dimensional changes on hydration of about 20%). Given the exceptional strength of the PBO substrate, the mechanical properties of the composites are well in excess of current state of the art fuel cell membranes.

Example 12

Fabrication of SPEM
Using PBO and sulfonated Ultrason®

Ion-conducting membranes fabricated in this example followed closely those in Example 9. The substrate utilized was PBO film extruded and solvent exchanged into NMP as described above in the general procedure. The ion-conducting polymer (75% sulfonated Ultrason purified—Na+ form) was synthesized according to Example 3 given above.

Microporous PBO, having been exchanged into NMP without collapse of the pores, was added to a solution of the sulfonated 75% sulfonated Ultrason polymer in NMP (8 or 12 wt. %). After twelve or more hours at room temperature the films were removed, stretched in tensioning rings, and dried of the solvent (see general procedure outlined above). Specifically, the sulfonated Radel R®/PBO films were dried in a low humidity chamber (<5% RH) for 1 to 2 days, vacuum dried in an oven heated from below 60° C. to 140° C.

Low Temperature Vacuum Pressing

| Step | Temp. | Hold Time | Force | Ramp Rate |
|---|---|---|---|---|
| 1 | 125° F. | 20 min | 2.9 klb | 15 F/min |
| 2 | 200° F. | 20 min | 2.9 klb | 15 F/min |
| 3 | 275° F. | 20 min | 2.9 klb | 15 F/min |
| 4 | 390° F. | 20 min | 2.9 klb | 15 F/min |
| 5 | 85° F. | — | 2.9 klb | 25 F/min |

The force of 2.9 klb corresponds to a press pressure of 100 psi. Films were finally hot pressed without vacuum to fully consolidate the composite structure, as shown below.

After all solvent is fully extracted from the membrane, the composite is preferably hot pressed. The hot pressing operation facilitates flow of the ion-conductor to make a homogenous composite structure. Non-porous Teflon® shims were placed on each side of the composite membrane followed by Titanium shims. The entire setup is then loaded into a press and subjected to the following cycle:

High Temperature Hot Press

| Step | Temp. | Hold Time | Force | Ramp Rate |
|---|---|---|---|---|
| 1 | 390° F. | 15 min | 28.3 klb | 15 F/min |
| 2 | 85° F. | 5 min | 28.3 klb | 25 F/min |

The force of 28.3 klbf corresponds to a press pressure of 1000 psi.

SPEMs produced via this example were FMI 126-08E, FMI 126-08F. See Table 5 for various results obtained from SPEMs made via this procedure.

Example 13

Fabrication of SPEM Using Cast PBO and Sulfonated Radel R®

Ion-conducting membranes can be fabricated as illustrated above in Example 12 with use of microporous PBO substrates obtained by the film casting techniques enumerated in the general procedures. These films were solvent exchanged from water into NMP, after the coagulation and rinsing. These microporous films were placed in ion conductor solutions (5-10 wt. % in NMP) and allowed to equilibrate for a day or more. Once infused with the ion conductor solution, the films were placed in tensioning rings and dried of the solvent. In the case of the sulfonated Radel R®/cast PBO films, samples were first dried in a low humidity chamber for 1 or more days at room temperature and then vacuum dried at 200° C.

After all the solvent had been dried from the membrane, the composite structure was hot pressed using methods similar to those in Example 9. SPEMs produced via this example were FMI 126-AY1, FMI 126-82BE and FMI 126-d91BO. See Table 5 for various properties of these composite membranes.

Example 14

Fabrication of SPEM Using Microporous Poly(ether sulfone) Substrate and Nafion®1100EW Ion Conductor A commercially available microporous membrane made of poly(ether sulfone) was obtained from Memtec (BTS-80), with a 0.02 micron pore size and an approximate porosity (void volume) of 80%. This microporous membrane was soaked in a Nafion® 1100 EW solution (water/alcohol solvent). A vacuum was drawn on the solution and film to degas and completely fill the pores. The film was then removed from the solution and vacuum dried (to approx. 100° C.). This process was repeated two more times, each time the film was added to the solution, vacuum degassed, and dried of solvent. Finally, the ion-conducting component was placed in the sodium salt form by soaking in saturated sodium bicarbonate solution by repeated rinsing followed by vacuum drying. Properties of a SPEM produced using the above method are shown for FMI 126-79BB in Table 5.

Example 15

Crosslinking of Sulfonated PPSU

Ion-conducting polymeric samples can be crosslinked in the acid (H+) form to improve ICP stability. Normally, crosslinking is performed in vacuum, to exclude oxygen from the system (can cause ICP charring). For example, SPPSU was crosslinked in a vacuum oven preheated to temperatures of 200, 225 and 250° C. for durations of up to 8 hours. Under these conditions, samples showed a slight IEC loss (~10%), and little improvement in long term stability (peroxide test). More severe conditions were employed by exposing samples to 250° C. in full vacuum for more than 20 hours. Peroxide testing did not show any considerable difference between SPPSU crosslinked films and SPPSU controls until heated for at least 32 hours. The SPPSU films crosslinked at 250° C. for 32 hours and 72 hours maintained their film integrity during the peroxide accelerated life test. The IEC of these test samples decreased significantly. Specifically, a loss of 63% (1.90 to 0.69 meg/g) for the 32 hour sample and a loss of 73% (1.90 meg/g to 0.51 meq/g) for the 72 hour crosslinked SPPSU films was calculated. It is anticipated that many of the $SO_3H$ acid groups form aromatic sulfone (Ar—$SO_2$—Ar) crosslinks between polymer chains. This trend confirms that crosslinking (H+ form) of sulfonated polymers can be used to improve long term membrane stability.

Example 16

Synthesis of Water Soluble Sulfonated Polyphenyl Sulfone

Reaction Scheme:

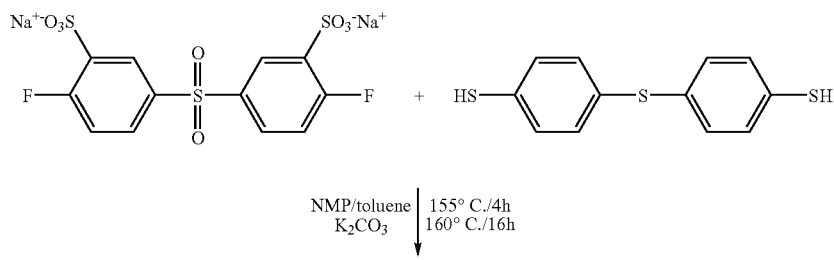

-continued

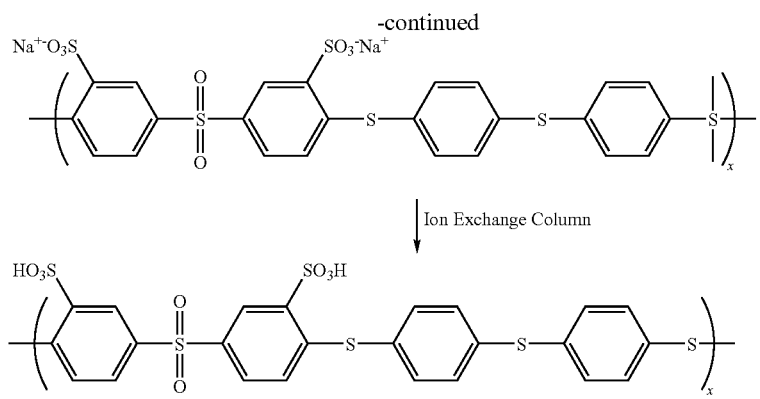

Bis(3-sulfonato, 4-fluorophenyl)sulfone monomer was reacted with 4-4'-thiobisbenzene thiol in the presence of potassium carbonate to prepare SPSS-100 water soluble sulfonated poly(phenylene sulfide sulfone) polymer. A three-necked round-bottomed flask was equipped with a mechanical stirrer, nitrogen adapter and Dean-Stark trap with condenser. The flask was charged with 13.747 g (30 mmol) sulfonated difluorodiphenyl sulfone, 7.512 g (30 mmol) of 4,4'-thiobisbenzene thiol, 9.54 g (69 mmol) potassium carbonate, 32 ml of toluene and 60 ml of N-methyl pyrrolidinone. The mixture was then stirred under nitrogen at 155° C. for 8 hours. Any water that collected in the Dean-Stark trap was drained and the temperature was increased to 160° C. for 24 hours. The temperature was increased to 170° C. and heating was continued for another 24 hours. The reaction mixture was cooled and the polymer was precipitated from methanol. The polymer precipitant was filtered and dried at 100° C. under vacuum overnight. To clean the polymer, the solid was dissolved at about 4 wt % in water and dialyzed using 1K SpectraPor® dialysis tubing through three rinses over the span of two days. The cleaned polymer was dried again and weighed. Elemental analysis was used to confirm the identity of the polymer and found it to be a dihydrate. In order to exchange the polymer to its acid form, it was re-dissolved in water at 1 wt % and run through a column of Amberlyst® ion exchange resin. The cleaned and converted polymer was dried under vacuum at 100° C. Titration of the water soluble polymers gave the expected average ion exchange capacity (IEC) of 3.2 milliequivalents of $H^+$/g of polymer (see Table 6) and thermogravimetric analysis (TGA) showed clean materials with the anticipated sulfonic acid groups lost at roughly 250° C.

TABLE 6

EC values of SPSS-100 batches

| Polymer # | IEC (mequiv of $H^+$/g of polymer) | % from theoretical |
| --- | --- | --- |
| 412-54-1 | 3.1 | 3.125 |
| 412-54-2 | 3.1 | 3.125 |
| 412-67-1 | 3.154 | 1.4375 |
| 412-74-1 | 3.241 | −1.28125 |
| 412-74-3 | 3.16 | 1.25 |
| 412-77-2 | 3.1 | 3.125 |

Example 2

Imbibing Water Soluble Ion Conducting Polymer into PBO

PEMs were prepared by an imbibing process during which porous unconsolidated PBO membranes were soaked in aqueous solutions of ICP. To imbibe with water-soluble ICP, PBO membranes were first tensioned in stainless steel rings. The films were then soaked in solutions 20 wt % ICP in water at 80° C. overnight. This allowed the ICP concentration in the membrane pores to reach equilibrium with the bulk solution concentration. The films were pulled out of the imbibing solution and excess surface ICP was removed. Any desired surface treatment was then performed. Surface treatment could include application of a thin layer by immersion of the PEM in a 2% Nafion/dimethyl acetamide (DMAc) solution. The samples were dried to 175° C. on a ramp and soak cycle (see below)

PEM Drying Cycle:
1. Ramp (1 deg/min) to 75° C. and soak for 60 minutes
2. Ramp(1 deg/min) to 100° C. and soak for 60 minutes
3. Ramp(1 deg/min) to 150° C. and soak for 60 minutes
4. Ramp(1 deg/min) to 175° C. and soak for 60 minutes Collapse of the structure upon drying yielded a fully densified PEM. Weight calculations showed PEMs are comprised of an average of 50-60% ion-conducting polymer. Area specific resistance (ASR) was tested for the SPSS-100 imbibed PEMs and found to be between 90 and 240 mohms*$cm^2$. These data indicate successful imbibition of the water soluble ICP into the PBO membranes.

Example 3

Imbibing Water Soluble Ion Conducting Polymer into PBZT

PEMs were prepared by an imbibing process during which porous unconsolidated PBZT membranes were soaked in solutions of ICP. To imbibe with water-soluble ICP, PBZT membranes were first tensioned in stainless steel rings. The films were then soaked in solutions of water and 20 wt % ICP at 80° C. overnight. This allowed the ICP concentration in the membrane pores to reach equilibrium with the bulk solution concentration. The films were pulled out of the imbibing solution and any excess surface ICP was removed. Any desired surface treatment was then performed. Surface treatment could include application of a thin layer of Nafion® by immersion of the PEM in a 2% Nafion/DMAc solution. The samples were dried to 175° C. on a ramp and soak cycle (see below)

PEM Drying Cycle:
1. Ramp (1 deg/min) to 75° C. and soak for 60 minutes
2. Ramp(1 deg/min) to 100° C. and soak for 60 minutes
3. Ramp(1 deg/min) to 150° C. and soak for 60 minutes
4. Ramp(1 deg/min) to 175° C. and soak for 60 minutes Collapse of the structure upon drying yielded a fully densified PEM. Weight calculations showed PEMs are comprised of an average of 60-70% ion conducting polymer. ASRs for the SPSS-100 imbibed PEM's were found to be between 90 and 240 mohms*cm². These data indicate successful imbibition of the water soluble ICP into the PBZT membranes.

Example 4

Comparison of PBO Imbibed with Water Soluble Polymer Versus Water Insoluble Polymer PEMs were prepared to compare the use of SPSS-100, a water soluble polymer to SPES-40, an organic solvent-soluble polymer as the imbibed ion-conducting polymer in PBO substrates. These PEMs were evaluated for conductivity and mechanical strength. Chemical structures of the two polymers are shown in Table 7. The water soluble polymer is inherently more brittle and was thus expected to reduce the mechanical strength of the PEM. For comparable PEMs in the dry state, the tensile strength was seen to drop from 28 ksi for SPES-40 imbibed film to 14 ksi for the SPSS-100 imbibed films, while the tensile modulus was 0.6 msi for SPES-40 imbibed film and 0.45 msi for the SPSS-100 imbibed films. While use of the water soluble polymer clearly does reduce the PEM strength, the SPSS-100 imbibed PEM's mechanical strength still makes it favorable for use as fuel cell membrane. The mechanical strength of Nafion is much lower, particularly when it is hydrated, indicating SPSS-100 imbibed PBO PEMs have improved strength over the state-of-the-art membranes. The use of the water soluble polymer as an ICP dramatically improves the ASR of our PEMs. PEMs imbibed with SPES-40 were found to have extremely high ASR of 3429 mohms*cm². However, using SPSS-100 decreased the ASR to 121 mohms*cm². This decrease in ASR and good mechanical strength indicate SPSS-100/PBO PEMs are good candidates for fuel cell membranes.

TABLE 8

Table of PEMs

| PEM | ASR (mohms * cm²) | Tensile Strength (ksi) | Tensile Modulus (msi) |
|---|---|---|---|
| Nafion 1135 | 101 | 5.25 dry | 0.034 dry |
|  |  | 3.95 hydrated | 0.003 hydrated |
| SPES-40-imbibed PBO | 3429 | 28 dry | 0.6 dry |
| SPSS-100-imbibed PBO | 126 | 14 dry | 0.45 dry |
|  |  | 14 hydrated | 0.3 hydrated |

Example 5

MEA Preparation

Using SPSS-100/PBO-based PEMs prepared according to example 2, membrane-electrode assemblies (MEAs) were made by hot pressing Nafion® electrodes with standard techniques. PEMs for MEA fabrication were prepared with a Nafion® surface treatment (see example 2 above). The catalyst ink was prepared by combining 125 mg of a 5% Nafion® solution with 250 mg of a 1:1 IPA/H₂O solution in a 7 ml sample vial. The alcohol serves as a solvent for Nafion® and water is used to slow down the overall evaporation rate and allow increased working time. The mixture was placed in an ice bath on a mixing plate to further slow down solvent evaporation. In cases where the mixture gelled, an additional 125 mg of IPA/ H₂O solution was added. The catalyst used was a 20 wt. % Platinum supported on carbon black (Vulcan XC-72) powder. On a filter paper, 25 mg of catalyst powder was weighed out. The catalyst powder was slowly added to the aqueous Nafion solution. The ink was then placed in an ultrasonic mixer (still in ice bath) for 10 minutes in order to give a good dispersion of the catalyst powder in the solvent. Lastly, the ink solution was placed on a mixing plate for 30 minutes in order to ensure complete mixing.

To prepare the MEA, the ink was then painted onto commercially available 5 cm² gas diffusion layers (GDLs) to achieve Pt loadings of 0.4-0.5 mg/cm². The prepared PEMs-

TABLE 7

Ion Conducting Polymers:

| ICP type | ICP Structure | Ave. % Loading in PEM | ASR[a] | IEC[b] |
|---|---|---|---|---|
| SPSS-100 | [structure with HO₃S, SO₃H groups on sulfone-linked aromatic backbone with thioether linkages] | 62 | 126 | 3.2 |
| SPES-40 | [structure with HO₃S, SO₃H groups on sulfone-linked aromatic backbone with ether linkages, subscripts 4 and 6] | 57.7 | 3429 | 1.28 |

[a]measured in mohms*cm²;
[b]mequiv of H⁺/gram polymer.

were sandwiched between these painted GDLs (with electrodes facing the PEM) and 3 in×3 in Teflon® gaskets, and then hot pressed using the following conditions:
1. Heat press to 100° C. and insert MEA
2. Hold for 5 minutes
3. Increase force to 4000 lbs and temperature to 140° C.
4. Hold for 90 seconds
5. Remove from press, lay on bench top, and apply force via lead brick during cooling
6. Wait 10-15 minutes before removing from aluminum plates.

Polarization curves were run on the MEAs to collect performance data. A typical polarization curve for such an MEA is shown in FIG. 3.

What is claimed is:

1. A composite solid polymer electrolyte membrane (SPEM) comprising a porous polymer substrate interpenetrated with a water soluble ion-conducting material, wherein
   (i) the porous polymer substrate comprises a homopolymer or copolymer of a liquid crystalline polymer and
   (ii) the ion-conducting material comprises a water soluble homopolymer or water soluble copolymer of at least one of a sulfonated ion-conducting aromatic polymer.

2. The SPEM of claim 1, wherein the ion-conducting aromatic polymer comprises a wholly aromatic ion-conducting polymer.

3. The SPEM of claim 1, wherein the ion-conducting aromatic polymer comprises a sulfonated polyimide polymer.

4. The SPEM of claim 2, wherein the sulfonated wholly-aromatic ion-conducting polymer comprises a sulfonated derivative of a polysulfone (PSU) polymer.

5. The SPEM of claim 4, wherein
   the polysulfone polymer comprises a polyethersulfone (PES) polymer.

6. The SPEM of claim 1, wherein the ion-conducting material comprises at least one of a polystyrene sulfonic acid (PSSA), poly(trifluorostyrene) sulfonic acid, and polyvinyl sulfonic acid (PVSA) polymer.

7. The SPEM of claim 1, wherein the porous polymer substrate comprises a homopolymer or copolymer of at least one of a substituted or unsubstituted polybenzazole polymer, and wherein the ion-conducting material comprises a sulfonated derivative of a homopolymer or copolymer of a polysulfone (PSU) polymer.

8. The SPEM of claim 7, wherein the polysulfone polymer comprises a polyethersulfone (PES) polymer.

9. The SPEM of claim 8, wherein the polysulfone polymer is produced by condensation of (4,4'-dihalophenyl)sulfone, sulfonated (4,4'-dihalophenyl)sulfone or a mixture thereof with 4,4'-bisphenolbiphenol, or 4,4'-biphenylbiphenyl-dithiol, 1,4-hydroquinone, 1,4-benzene dithiol, and mixtures thereof, each of which may be optionally sulfonated.

10. The SPEM of claim 9, wherein at least 75% of the (4,4'-dihalophenyl)sulfone monomer is sulfonated at the 3 and 3' position.

11. The SPEM of claim 9, wherein at least 90% of the (4,4'-dihalophenyl)sulfone monomer is sulfonated at the 3 and 3' position.

12. The SPEM of claim 9, wherein substantially all of the (4,4'-dihalophenyl)sulfone monomer is sulfonated at the 3 and 3' position.

13. The SPEM of claim 9, wherein the polysulfone polymer is a compound of the formula:

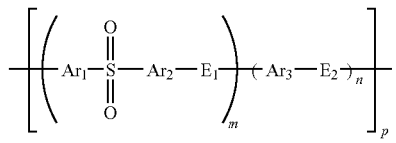

wherein
$Ar_1$, $Ar_2$, and $Ar_3$ are independently selected at each occurrence from carbocyclic aromatic groups having between 6 and 18 carbon ring atoms and between 1 and 3 rings; and
at least a portion of the $Ar_1$, $Ar_2$, and $Ar_3$ groups are substituted with sulfonic acid residues;
each occurrence of $E_1$ and $E_2$ is independently selected from the group consisting of O, S, and $SO_2$;
$m \geq 1$;
n is an integer of between 0 and about 10; and
p is an integer of between 2 and about 10,000.

14. The SPEM of claim 13, wherein the polysulfone polymer is a compound of the formula:

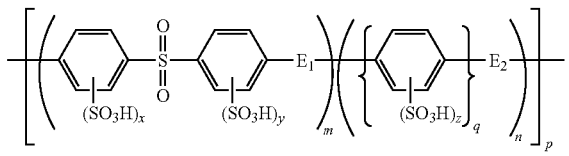

wherein
x, y, and z are integers of between 0 and 4, which are independently selected at each occurrence of x, y or z in the formula, wherein at least a portion of the occurrences of x, y and z is not zero;
each occurrence of $E_1$ and $E_2$ is independently selected from the group consisting of O, S, and $SO_2$;
$m \geq 1$;
n is an integer of between 0 and about 10;
p is an integer of between 2 and about 1,000; and
q is 1, 2, or 3.

15. The SPEM of claim 14, wherein p is an integer of between about 5 and about 500.

16. The SPEM of claim 14, wherein z is zero; and at least about 80% of the occurrences of x and y are not zero.

17. The SPEM of claim 1, wherein the SPEM is substantially thermally stable to temperatures of at least about 100° C.

18. The SPEM of claim 1, wherein the SPEM is substantially thermally stable to temperatures of at least about 100° C. to at least about 175° C.

19. The SPEM of claim 1, wherein the SPEM is stable from at least about 100° C. to at least about 150° C.

20. The SPEM of claim 1, wherein the SPEM is stable from at least about 120° C. to at least about 175° C.

21. The SPEM of claim 1, wherein the SPEM is substantially stable to temperatures of at least about 120° C.

22. The SPEM of claim 1, wherein the porous polymer substrate comprises a microinfrastructure substantially interpenetrated with the ion-conducting material.

23. The SPEM of claim 1, wherein the porous polymer substrate comprises an extruded or cast film.

24. The SPEM of claim 1, wherein the liquid crystalline polymer substrate comprises a lyotropic liquid crystalline polymer.

25. The SPEM of claim 24, wherein the lyotropic liquid crystalline polymer substrate comprises a polybenzazole (PBZ) polymer.

26. The SPEM of claim 25, wherein the polybenzazole polymer substrate comprises a homopolymer or copolymer of a polybenzoxazole (PBO) polymer.

27. The SPEM of claim 26, wherein the polybenzazole polymer substrate comprises a an alternating structure comprising an optionally substituted phenyl or naphthyl group and a repeat unit selected from benzoxazole, benzothiazole, diimidazo-pyridine, and benzimidazole.

28. The SPEM of claim 1, wherein the pore size of the porous polymer substrate is from about 10 Å to about 20,000 Å.

29. The SPEM of claim 28, wherein the pore size is from about 10 Å to about 2,000 Å.

30. The SPEM of claim 28, wherein the pore size is from about 500 Å to about 10,000 Å.

31. The SPEM of claim 1, wherein the ion-conducting material has an ion-conductivity from about 0.01 S/cm to about 1.0 S/cm.

32. The SPEM of claim 1, wherein the ion-conducting material has an ion-conductivity greater than about 0.1 S/cm.

33. The SPEM of claim 1, wherein the ion-conducting material has an ion-exchange capacity greater than about 2.5 milliequivalents per gram.

34. The SPEM of claim 33, wherein the ion-conducting material has an ion-exchange capacity of between about 2.5 and about 5.0 milliequivalents per gram.

35. The SPEM of claim 1, wherein the SPEM has an area specific resistance from about 0.02 to about 20 $\Omega \cdot cm^2$.

36. The SPEM of claim 1, wherein the SPEM has an area specific resistance of less than about 0.2 $\Omega \cdot cm^2$.

37. The SPEM of claim 1, wherein the SPEM has a thickness from about 0.1 mil. to about 5.0 mil.

38. The SPEM of claim 1, wherein the thickness is about 1 mil.

39. The SPEM of claim 1, wherein the ion-conducting material further comprises one or more antioxidants.

40. The SPEM of claim 1, wherein the ion-conducting material further comprises sulfone crosslinkages.

\* \* \* \* \*